United States Patent
Sato

(10) Patent No.: US 8,574,386 B2
(45) Date of Patent: *Nov. 5, 2013

(54) METHOD FOR MANUFACTURING HONEYCOMB STRUCTURE

(75) Inventor: Hiroki Sato, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 440 days.

This patent is subject to a terminal disclaimer.

(21) Appl. No.: 12/369,876

(22) Filed: Feb. 12, 2009

(65) Prior Publication Data

US 2009/0199953 A1  Aug. 13, 2009

(30) Foreign Application Priority Data

Feb. 13, 2008  (WO) .................. PCT/JP2008/052375

(51) Int. Cl.
 C04B 33/34  (2006.01)
 C03B 29/00  (2006.01)
 B29C 65/00  (2006.01)
 C04B 35/64  (2006.01)

(52) U.S. Cl.
 USPC ........ 156/89.22; 156/60; 156/89.11; 264/630

(58) Field of Classification Search
 USPC ........................................... 156/89.22, 89.12
 See application file for complete search history.

(56) References Cited

U.S. PATENT DOCUMENTS

| | | | |
|---|---|---|---|
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |

(Continued)

FOREIGN PATENT DOCUMENTS

| | | |
|---|---|---|
| EP | 1375849 | 1/2004 |
| EP | 1433528 | 6/2004 |

(Continued)

OTHER PUBLICATIONS

Extended European Search Report for corresponding EP Application No. 08291249.4-1253, Apr. 5, 2011.

*Primary Examiner* — Philip Tucker
*Assistant Examiner* — Alex Efta
(74) *Attorney, Agent, or Firm* — Ditthavong Mori & Steiner, P.C.

(57) ABSTRACT

A method for manufacturing a honeycomb structure includes molding a ceramic raw material to manufacture at least one honeycomb molded body having a plurality of cell walls extending along a longitudinal direction of the at least one honeycomb molded body to define cells. The honeycomb molded body is fired to manufacture a honeycomb fired body. A honeycomb block is manufactured by using the honeycomb fired body. The honeycomb fired body is cut before manufacturing the honeycomb block or the honeycomb block is cut after manufacturing the honeycomb block.

46 Claims, 24 Drawing Sheets

B-B line cross-sectional view

(56) References Cited

U.S. PATENT DOCUMENTS

| | | |
|---|---|---|
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 7,550,026 B2 | 6/2009 | Hayakawa |
| 7,556,666 B2 | 7/2009 | Kunieda |
| 8,323,557 B2 * | 12/2012 | Sato .............................. 264/630 |
| 2004/0161373 A1 * | 8/2004 | Ichikawa et al. ............... 422/180 |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0266992 A1 | 12/2005 | Ohno et al. |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0093784 A1 | 5/2006 | Komori et al. |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0269722 A1 | 11/2006 | Yamada |
| 2007/0004592 A1 * | 1/2007 | Ohno et al. .................... 502/439 |
| 2007/0020155 A1 | 1/2007 | Ohno et al. |
| 2007/0028575 A1 | 2/2007 | Ohno et al. |
| 2007/0048494 A1 * | 3/2007 | Miyairi et al. ................. 428/116 |
| 2007/0059483 A1 * | 3/2007 | Fujita et al. ................... 428/116 |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1666118 | 6/2006 |
| EP | 1698604 A1 * | 9/2006 |
| EP | 1717218 | 11/2006 |
| EP | 1736224 | 12/2006 |
| EP | 1785603 | 5/2007 |
| EP | 1826517 A1 * | 8/2007 |
| EP | 2090351 | 8/2009 |
| JP | 07090319 A * | 4/1995 |
| JP | 2001-162121 | 6/2001 |
| JP | 2002-166404 | 6/2002 |
| JP | 2004-167482 | 6/2004 |
| JP | 2005-046839 | 2/2005 |
| JP | 2006-255574 | 9/2006 |
| JP | 2008-012914 | 1/2008 |
| WO | WO 2005/002709 | 1/2005 |
| WO | WO 2005/063653 | 7/2005 |
| WO | WO 2006/025283 | 3/2006 |
| WO | WO 2006/137159 | 12/2006 |

* cited by examiner

B-B line cross-sectional view

F-F line cross-sectional view

K-K line cross-sectional view

METHOD FOR MANUFACTURING HONEYCOMB STRUCTURE

CROSS-REFERENCE TO RELATED APPLICATIONS

The present application claims priority under 35 U.S.C. §119 to PCT Application No. PCT/JP2008/052375, filed Feb. 13, 2008, the contents of which are incorporated herein by reference in their entirety.

BACKGROUND OF THE INVENTION

1. Field of the Invention

The present invention relates to a method for manufacturing a honeycomb structure.

2. Discussion of the Background

Exhaust gases discharged from conventional internal combustion engines such as a diesel engine contain particulate matter (hereinafter, also referred to as PM). In recent years, the PM has raised serious problems because it is harmful to the environment and the human body.

For this reason, various honeycomb filters such as a honeycomb filter including a porous ceramic honeycomb structure have been proposed as filters that capture PM in exhaust gases and purify the exhaust gases.

As such a honeycomb structure, there has been disclosed a honeycomb structure in which a plurality of filters including a porous ceramic sintered body are integrated by bonding peripheral faces of the filters with one another with a sealing material layer (adhesive layer) interposed therebetween (see, for example, JP-A 2001-162121).

A honeycomb structure of this kind can be manufactured as follows.

First, a ceramic powder, a binder, a dispersant solution and the like are mixed to prepare a wet mixture.

Next, the wet mixture is extrusion-molded, and the extrusion-molded body is cut into a predetermined length to form a honeycomb molded body.

Thereafter, a plug material paste is injected to a predetermined end of each cell of the honeycomb molded body to seal each cell at either one end. Next, the honeycomb molded body with the plug material paste filled therein is degreased and fired to form honeycomb fired bodies to be used as a filter.

Next, a plurality of the honeycomb fired bodies are combined with one another with a sealing material layer (adhesive layer) interposed therebetween to form an aggregated body of the honeycomb fired bodies. Thereafter, if necessary, the periphery of the aggregated body of the honeycomb fired bodies is cut and a coat layer is formed on the periphery of the aggregated body to manufacture a honeycomb structure.

Further, as such a honeycomb structure used as a catalyst carrier, a honeycomb structure in which porous ceramic units each containing a first inorganic material (for example, ceramic particles), a second inorganic material (for example, inorganic fibers or ceramic particles having a larger particle diameter) and an inorganic binder are joined to one another with a sealing material interposed therebetween has been disclosed (see, for example, WO 2005/063653 A1).

The contents of JP-A 2001-162121 and WO 2005/063653 A1 are incorporated herein by reference in their entirety.

SUMMARY OF THE INVENTION

According to one aspect of the present invention, a method for manufacturing a honeycomb structure includes molding a ceramic raw material to manufacture at least one honeycomb molded body having a plurality of cell walls extending along a longitudinal direction of the at least one honeycomb molded body to define cells. The honeycomb molded body is fired to manufacture a honeycomb fired body. A honeycomb block is manufactured by using the honeycomb fired body. The honeycomb fired body is cut before manufacturing the honeycomb block or the honeycomb block is cut after manufacturing the honeycomb block.

According to another aspect of the present invention, a method for manufacturing a honeycomb structure includes molding a ceramic raw material to manufacture at least one honeycomb molded body having a plurality of cell walls extending along a longitudinal direction of the at least one honeycomb molded body to define cells. A first plug material paste is provided in the cells at either one end of each of the cells to seal cells. The at least one honeycomb molded body with the plug material paste is fired to manufacture at least one honeycomb fired body. A honeycomb block is manufactured by using the at least one honeycomb fired body. Each of the at least one honeycomb fired body is cut into cut honeycomb fired bodies having cut end. A second plug material paste is provided in the cells at the cut end to seal the respective cells at either one end in the longitudinal direction. The second plug material paste is fired.

DESCRIPTION OF THE EMBODIMENTS

Figure 1A:
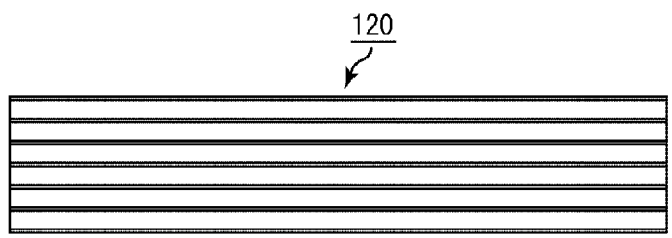
FIGS. 1A to 1F are explanatory views each illustrating manufacturing processes of the first embodiment of the present invention.

In the methods for manufacturing a honeycomb structure described in JP-A 2001-162121 and WO 2005/063653 A1, upon manufacturing a honeycomb molded body by extrusion-molding, the honeycomb molded body is formed to have almost the same shape as that of a honeycomb fired body to be manufactured, and various treatments such as sealing (plugging), if necessary, degreasing and firing are carried out to manufacture the honeycomb fired body.

In such a manufacturing method, the honeycomb fired body becomes slightly smaller than the honeycomb molded body because of the firing treatment. Here, it is presumed that the reduction in the size inevitably occurs.

For this reason, upon manufacturing a honeycomb molded body, the honeycomb molded body is formed to have a slightly larger size than that of a honeycomb fired body to be manufactured in consideration of the size reduction.

However, since the amount of the size reduction is an estimated value, the manufactured honeycomb fired bodies may have variations in the size depending on firing conditions and the like.

In case of using honeycomb fired bodies having variations in the size, when a honeycomb structure is manufactured by combining a plurality of the honeycomb fired bodies with one another, the manufactured honeycomb structure may have irregular end faces, and thus require a grinding treatment to be carried out on the end faces in some cases.

However, the end-face grinding treatment is desirably omitted, if possible. This is because the grinding treatment may cause problems such as occurrence of cracks on the end faces of the honeycomb structure. Moreover, an additional treatment directly causes an increase in the costs.

Moreover, when a honeycomb molded body having almost the same shape as that of the honeycomb fired body to be manufactured is formed and various treatments are carried out thereon, as described in the above-mentioned conventional method for manufacturing a honeycomb structure, the productivity tends to be lowered. In particular, this tendency becomes more apparent upon manufacturing a honeycomb structure having a shorter length in the longitudinal direction.

This will be described more in detail.

In such a method as the above-mentioned conventional method for manufacturing a honeycomb structure, the firing treatment of the honeycomb molded bodies is usually carried out with a plurality of honeycomb molded bodies housed in a single firing jig. Here, in order to allow the molded bodies to be sintered positively and uniformly, the honeycomb molded bodies need to be housed with a certain distance interval therebetween.

For this reason, when a firing jig having a certain size is used, the smaller the honeycomb molded bodies housed in the firing jig are, the wider the area is occupied by a space between the honeycomb molded bodies, more likely resulting in lower productivity of the honeycomb fired bodies.

In other words, in the firing jig having the certain size, for example, even when half-sized honeycomb molded bodies are used, the number of the honeycomb molded bodies that can be housed in the firing jig is not twice of the number of full-sized honeycomb molded bodies that can be housed in the firing jig, but less than twice thereof.

Moreover, a firing jig having a size that is best suited for the size of the honeycomb molded bodies is desirably used.

A method for manufacturing a honeycomb structure according to embodiments of the first aspect of the present invention includes: molding a ceramic raw material to manufacture a honeycomb molded body having a plurality of cells placed longitudinally in parallel with one another with a cell wall interposed therebetween; firing the honeycomb molded body to manufacture a honeycomb fired body; and manufacturing a honeycomb block by using at least a single piece of the honeycomb fired body, wherein the method further includes: cutting the honeycomb fired body into at least two pieces after the firing of the honeycomb molded body.

In the method for manufacturing a honeycomb structure according to the embodiments of the first aspect of the present invention, a honeycomb fired body is manufactured by firing the honeycomb molded body, and then the resulting honeycomb fired body is cut.

Since the honeycomb fired body is cut after being fired as described above, it may be easier to manufacture honeycomb fired bodies with high dimensional accuracy in the longitudinal direction and a smaller variation in the size.

Moreover, the method for manufacturing a honeycomb structure according to the embodiments of the first aspect of the present invention is suitable for manufacturing a honeycomb structure that has a short length in the longitudinal direction because the honeycomb molded body is fired to form a honeycomb fired body and then the resulting honeycomb fired body is cut.

In the method for manufacturing a honeycomb structure, the honeycomb molded body is housed in the firing jig and then fired. As described above, when a firing jig having a certain size is used, the smaller honeycomb molded bodies are used, the lower the productivity thereof becomes.

In contrast, in the method for manufacturing a honeycomb structure according to the embodiments of the first aspect of the present invention, the honeycomb fired body having a predetermined length is manufactured by firing the honeycomb molded body and then cutting the resulting honeycomb fired body.

For this reason, even when a honeycomb structure having a short length is manufactured, superior productivity tends to be achieved.

For example, even when a honeycomb structure having about a half length of a general length in the longitudinal direction is manufactured, the same firing jig as that generally used can be suitably used, and the number of about half-length honeycomb fired bodies that can be fired at the same time is about twice the number of general-length honeycomb fired bodies that can be fired at the same time, with the result that superior productivity tends to be achieved in comparison with the conventional method for manufacturing a honeycomb structure.

The method for manufacturing a honeycomb structure according to the embodiments of the first aspect of the present invention may further include: injecting a plug material paste to seal the respective cells of the honeycomb fired body obtained through the cutting at either one end of each cell.

It is possible to manufacture a honeycomb structure used as a filter by injecting the plug material paste to a predetermined end of each cell, as described above.

The method for manufacturing a honeycomb structure according to the embodiments of the first aspect of the present invention may further include: solidifying or firing the plug material paste on each end of the honeycomb fired body obtained through the cutting after the injecting of the plug material paste.

It is possible to positively seal predetermined ends of the cells by solidifying or firing the plug material paste, as described above.

In the method for manufacturing a honeycomb structure according to the embodiments of the first aspect of the present invention, the plug material paste injected in the manufacturing of the honeycomb block may contain at least inorganic particles and an inorganic binder.

In the method for manufacturing a honeycomb structure according to the embodiments of the first aspect of the present invention, the plug material paste may further contain at least one of inorganic fibers and whiskers.

In the method for manufacturing a honeycomb structure according to the embodiments of the first aspect of the present invention, the plug material paste having the above composition is used. Since the plug material paste is a particularly suitable material for plug portions to be formed without being fired, it is possible to manufacture a honeycomb structure in which predetermined cells are positively sealed.

In the method for manufacturing a honeycomb structure according to the embodiments of the first aspect of the present invention, the manufacturing of the honeycomb block may include combining a plurality of the honeycomb fired bodies with one another with an adhesive paste interposed therebetween, and wherein the firing of the honeycomb molded body, the combining, and the cutting of the honeycomb fired body are sequentially performed.

Composition of the plug material paste may be almost the same as composition of the adhesive paste.

When the composition of the plug material paste is almost the same as the composition of the adhesive paste, an inner stress caused by a difference between the thermal expansion coefficients of the component members is less likely to occur in the manufactured honeycomb structure. Therefore, it may be easier to manufacture a honeycomb structure having further improved reliability.

In the method for manufacturing a honeycomb structure according to the embodiments of the first aspect of the present invention, the manufacturing of the honeycomb block may include combining a plurality of the honeycomb fired bodies with one another with an adhesive paste interposed therebetween, and wherein the cutting of the honeycomb fired body, the combining, and the injecting of the plug material paste are sequentially performed.

In the method for manufacturing a honeycomb structure according to the embodiments of the first aspect of the present invention, the manufacturing of the honeycomb block may include combining a plurality of the honeycomb fired bodies with one another with an adhesive paste interposed therebetween, and wherein the cutting of the honeycomb fired body, the injecting of the plug material paste, and the combining are sequentially performed.

The methods for manufacturing a honeycomb structure according to the first aspect of the present invention are suitable for manufacturing a honeycomb block having a honeycomb block formed by a plurality of honeycomb fired bodies (hereinafter, also referred to aggregated honeycomb structure).

The method for manufacturing a honeycomb structure according to the embodiments of the first aspect of the present invention may further include: applying a coating material paste to a periphery of the honeycomb block to form a coat layer after the manufacturing of the honeycomb block.

In the methods for manufacturing a honeycomb structure according to the embodiments of the first aspect of the present invention, the formation of the coat layer on the outermost periphery may make it easier to manufacture a honeycomb structure having further improved reliability.

Moreover, the formation of the coat layer may make it easier to manufacture a honeycomb structure having a high peripheral accuracy (dimensional accuracy of the peripheral side face) as well as to prevent exhaust gases from leaking outside.

In addition, the coat layer is formed by heating and thereby solidifying the coating material paste.

In the method for manufacturing a honeycomb structure according to the embodiments of the first aspect of the present invention, the manufacturing of the honeycomb block may include combining a plurality of the honeycomb fired bodies with one another with an adhesive paste interposed therebetween, and wherein the cutting of the honeycomb fired body, and the combining are sequentially performed.

A method for manufacturing a honeycomb structure according to the embodiments of the second aspect of the present invention includes: molding a ceramic raw material to manufacture a honeycomb molded body having a plurality of cells placed longitudinally in parallel with one another with a cell wall interposed therebetween; first injecting a plug material paste to seal cells at predetermined positions on each end face of the honeycomb molded body, and then firing the honeycomb molded body to manufacture a honeycomb fired body; and manufacturing a honeycomb block by using at least a single piece of the honeycomb fired body, and further includes in sequence: cutting the honeycomb fired body into at least two pieces; second injecting a plug material paste to predetermined end portions of the honeycomb fired body obtained through the cutting with predetermined end portions sealed at one end to seal the respective cells at either one end; and firing the plug material paste injected in the second injecting.

In the method for manufacturing a honeycomb structure according to the embodiments of the second aspect of the present invention, the honeycomb molded body is fired to form a honeycomb fired body, and then the resulting honeycomb fired body is cut.

Since the honeycomb fired body is cut after being fired as described above, it may be easier to manufacture honeycomb fired bodies with high dimensional accuracy in the longitudinal direction and with a smaller variation in the size.

Moreover, the method for manufacturing a honeycomb structure according to the embodiments of the second aspect of the present invention is suitable for manufacturing a honeycomb structure that has a short length in the longitudinal direction because the honeycomb molded body is fired to form a honeycomb fired body and then the resulting honeycomb fired body is cut. The reason for this has been described above.

In the method for manufacturing a honeycomb structure according to the embodiments of the second aspect of the present invention, the manufacturing of the honeycomb block may include combining a plurality of the honeycomb fired bodies with one another with an adhesive paste interposed therebetween, and wherein the second injecting, the firing of the plug material paste injected in the second injecting, and the combining are sequentially performed.

The method for manufacturing a honeycomb structure according to the embodiments of the second aspect of the present invention can be suitable for manufacturing an aggregated honeycomb structure having a plurality of honeycomb fired bodies combined with one another.

The method for manufacturing a honeycomb structure according to the embodiments of the second aspect of the present invention may include: applying a coating material paste to a periphery of the honeycomb block to form a coat layer after the manufacturing of the honeycomb block.

In the method for manufacturing a honeycomb structure according to the embodiments of the second aspect of the present invention, the formation of the coat layer on the outermost periphery may make it easier to manufacture a honeycomb structure having further improved reliability.

Moreover, the formation of the coat layer may make it easier to manufacture a honeycomb structure having a high peripheral side face accuracy (dimensional accuracy of the peripheral side face) as well as to prevent exhaust gases from leaking outside.

In addition, the coat layer is formed by heating and thereby solidifying the coating material paste.

In the method for manufacturing a honeycomb structure according to the embodiments of the second aspect of the present invention, composition of the adhesive paste may be almost the same as composition of the coating material paste.

In the method for manufacturing a honeycomb structure according to the embodiments of the first or second aspect of the present invention, composition of the plug material paste may be almost the same as composition of the coating material paste.

When the composition of the plug material paste is almost the same as the composition of the coating material paste, an inner stress caused by a difference between the thermal expansion coefficients of the component members is less likely to occur in the manufactured honeycomb structure. Therefore, it may be easier to manufacture a honeycomb structure having further improved reliability.

In the method for manufacturing a honeycomb structure according to the embodiments of the first or second aspect of the present invention, composition of the plug material paste may be almost the same as composition of the ceramic raw material.

In the honeycomb structure manufactured by using the plug material paste and the ceramic raw material which have the same composition, peeling or a crack between the honeycomb fired body and the plug portion is less likely to occur. In addition, when the plug portions are formed through the firing, the peeling or crack is further less likely to occur.

In the method for manufacturing a honeycomb structure according to the embodiments of the first or second aspect of the present invention, the honeycomb fired body is desirably cut by using at least one of a diamond cutter, an OD diamond blade, an ID diamond blade, a multi-wire, and a multi-blade.

In the method for manufacturing a honeycomb structure according to the embodiments of the first or second aspect of the present invention, a plug material paste may not be injected in such a manner that each of the cells of the honeycomb fired body is sealed at either one end thereof.

In the method for manufacturing a honeycomb structure according to the embodiments of the first or second aspect of the present invention, the main component of the constituent materials of the honeycomb fired body desirably includes: at least one of nitride ceramics, carbide ceramics, and oxide ceramics; silicon-containing ceramics, in which metallic silicon is blended with at least one of the nitride ceramics, carbide ceramics, and oxide ceramics; or a ceramic material, in which the ceramics are bound by at least one of silicon or silicate compounds.

In the method for manufacturing a honeycomb structure according to the embodiments of the first or second aspect of the present invention, the main component of the constituent materials of the honeycomb fired body desirably includes at least one of silicon carbide and silicon-containing silicon carbide.

In the method for manufacturing a honeycomb structure according to the embodiments of the first or second aspect of the present invention, the ceramic raw material is desirably a raw material for manufacturing a fired body including one of cordierite and aluminum titanate.

In the method for manufacturing a honeycomb structure according to the embodiments of the first or second aspect of the present invention, the ceramic raw material is desirably a wet mixture containing inorganic fibers, inorganic particles, and an inorganic binder.

The inorganic fibers desirably include silica-alumina fibers, and the inorganic particles desirably include alumina particles.

In the method for manufacturing a honeycomb structure according to the embodiments of the first or second aspect of the present invention, the inorganic fibers desirably include at least one of silica-alumina fibers, alumina fibers, silica fibers, silicon carbide fibers, glass fibers, and potassium titanate fibers.

In the method for manufacturing a honeycomb structure according to the embodiments of the first or second aspect of the present invention, the inorganic particles desirably include at least one of alumina particles, silicon carbide particles, silicon nitride particles, silica particles, zirconia particles, titania particles, ceria particles, and mullite particles.

In the method for manufacturing a honeycomb structure according to the embodiments of the first or second aspect of the present invention, the inorganic binder desirably includes at least one of alumina sol, silica sol, titania sol, water glass, white clay, kaolin, montmorillonite, sepiolite, and attapulgite.

In the method for manufacturing a honeycomb structure according to the embodiments of the first or second aspect of the present invention, a firing temperature in the firing treatment is desirably at least about 600° C. and at most about 1200° C.

In the method for manufacturing a honeycomb structure according to the embodiments of the first or second aspect of the present invention, a plurality of the honeycomb fired bodies are combined with one another with an adhesive paste interposed therebetween, and the plurality of the combined honeycomb fired bodies may be cut to manufacture the honeycomb block.

In the method for manufacturing a honeycomb structure according to the embodiments of the first or second aspect of the present invention, honeycomb fired bodies each having a predetermined shape are manufactured, and a plurality of the manufactured honeycomb fired bodies may be combined with one another to manufacture the honeycomb block.

In the method for manufacturing a honeycomb structure according to the embodiments of the first or second aspect of the present invention, the honeycomb block may be manufactured by using a single piece of the honeycomb fired body.

The following description will discuss embodiments of the present invention.

First Embodiment

First, the following description will discuss a method for manufacturing a honeycomb structure according to the present embodiment in the order of processes.

FIGS. 1A to 1F are explanatory views each illustrating manufacturing processes of the first embodiment of the present invention.

(1) As a ceramic raw material, silicon carbide powders having different average particle diameters are used and mixed with an organic binder, a plasticizer, a lubricant and water to prepare a wet mixture for manufacturing a molded body.

(2) The wet mixture is charged into an extrusion-molding apparatus and extrusion-molded to form a honeycomb molded body having a predetermined shape. Here, an extrusion-molding die that forms each cell into a predetermined shape is selected.

Here, the honeycomb molded body is manufactured to have a longitudinal length almost twice as long as a designed value of a longitudinal length of a honeycomb structure to be manufactured. At this time, the length of the honeycomb molded body is determined in consideration of the amount of shrinkage at the time of firing and a cutting margin to be cut out.

Moreover, the honeycomb molded body is dried by using a drying apparatus.

(3) The honeycomb molded body manufactured in the process (2) is placed on a firing jig, and then, a degreasing treatment is carried out to decompose and remove the organic components in the honeycomb molded body by heating the honeycomb molded body in a degreasing furnace.

Subsequently, the degreased honeycomb molded body is charged into a firing furnace while being on the firing jig, and firing treatment is carried out at a predetermined temperature (for example, at least about 2200° C. and at most about 2300° C.) to manufacture a honeycomb fired body 120 (see FIG. 1A).

In the present invention, a "honeycomb molded body" includes a molded body on which the drying treatment or the degreasing treatment has been carried out in addition to a raw molded body immediately after being extrusion-molded.

(4) Next, the honeycomb fired body 120 manufactured in the process (3) is cut into two pieces having an equal longitudinal length.

The honeycomb fired body is cut by using a diamond cutter, an OD (outside diameter) diamond blade, an ID (inner diameter) diamond blade, a multi-wire, a multi-blade or the like.

Figure 1B:
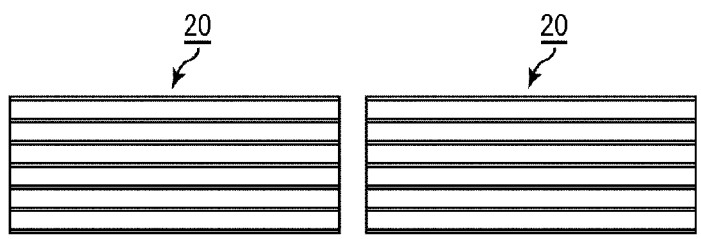

By carrying out such cutting treatment, the honeycomb fired bodies 20, which have a longitudinal length equal to a designed value of a longitudinal length of a honeycomb structure to be manufactured, can be manufactured (see FIG. 1B).

(5) Next, in the honeycomb fired body 20 manufactured in the process (4), the plug material paste is injected into end portions of cells 21 to seal each cell 21 at either one end thereof.

Here, as the plug material paste to be injected, for example, a plug material paste containing an inorganic binder, an organic binder and inorganic particles is used. The plug material paste may further contain at least one of inorganic fibers and whiskers.

Figure 1C:
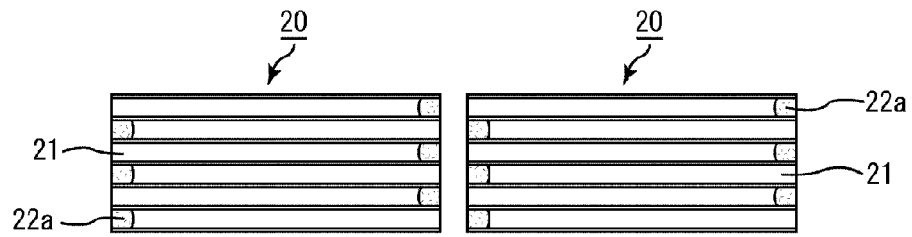

Next, the plug material paste injected in the process is solidified by heating, and formed into plug portions 22a (see FIG. 1C).

(6) Next, an adhesive paste for forming an adhesive layer is applied to side faces of the honeycomb fired bodies 20 having the cells each being sealed at the predetermined end to form an adhesive paste layer. Repeatedly another honeycomb fired body is laminated on the adhesive paste layer to manufacture an aggregated body 110 of the honeycomb fired bodies in which a predetermined number of the honeycomb fired bodies are combined with one another. Here, as the adhesive paste, an adhesive paste having almost the same composition as that of the plug material paste is used.

Subsequently, the aggregated body 110 of the honeycomb fired bodies is heated so that the adhesive paste layer is solidified and formed into an adhesive layer 11 (see FIGS. 1D and 1E).

Figure 1D:
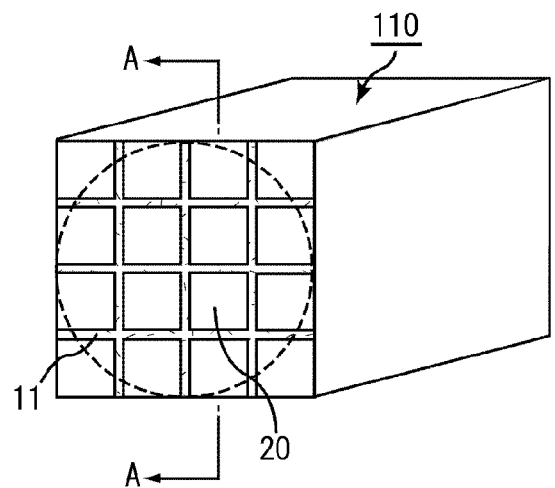
Figure 1E:
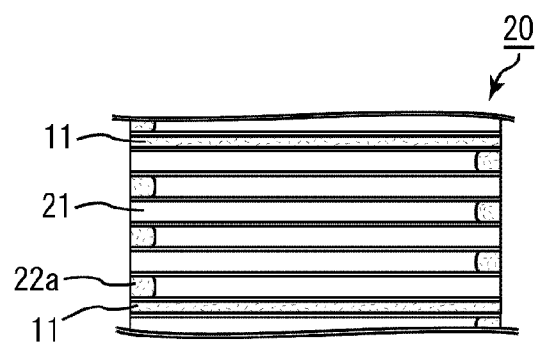
Figure 1F:
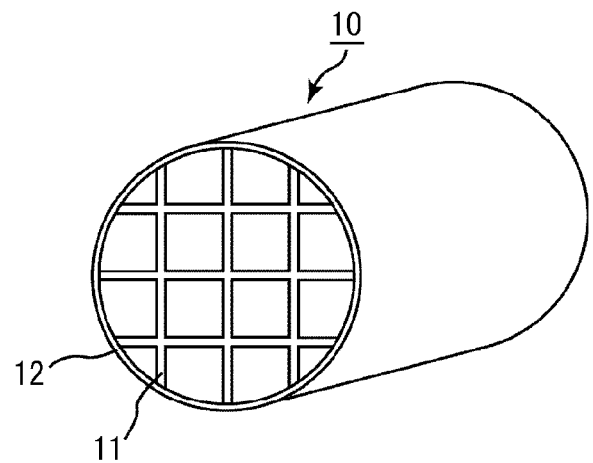

Here, FIG. 1E is a partially enlarged A-A line cross-sectional view of FIG. 1D.

(7) Thereafter, the aggregated body 110 of the honeycomb fired bodies is cut along a broken line in FIG. 1D by using a diamond cutter and the like to form a honeycomb block. A coating material paste is applied to the periphery of the honeycomb block. The coating material paste is heated and solidified to form a coat layer 12. Thus, a honeycomb structure 10 is manufactured (see FIG. 1F).

Here, for example, a paste-form composition having almost the same composition as that of the plug material paste is used as the coating material paste.

Next, with reference to the figures, the following description will discuss a honeycomb structure manufactured by such a manufacturing method.

Figure 2:
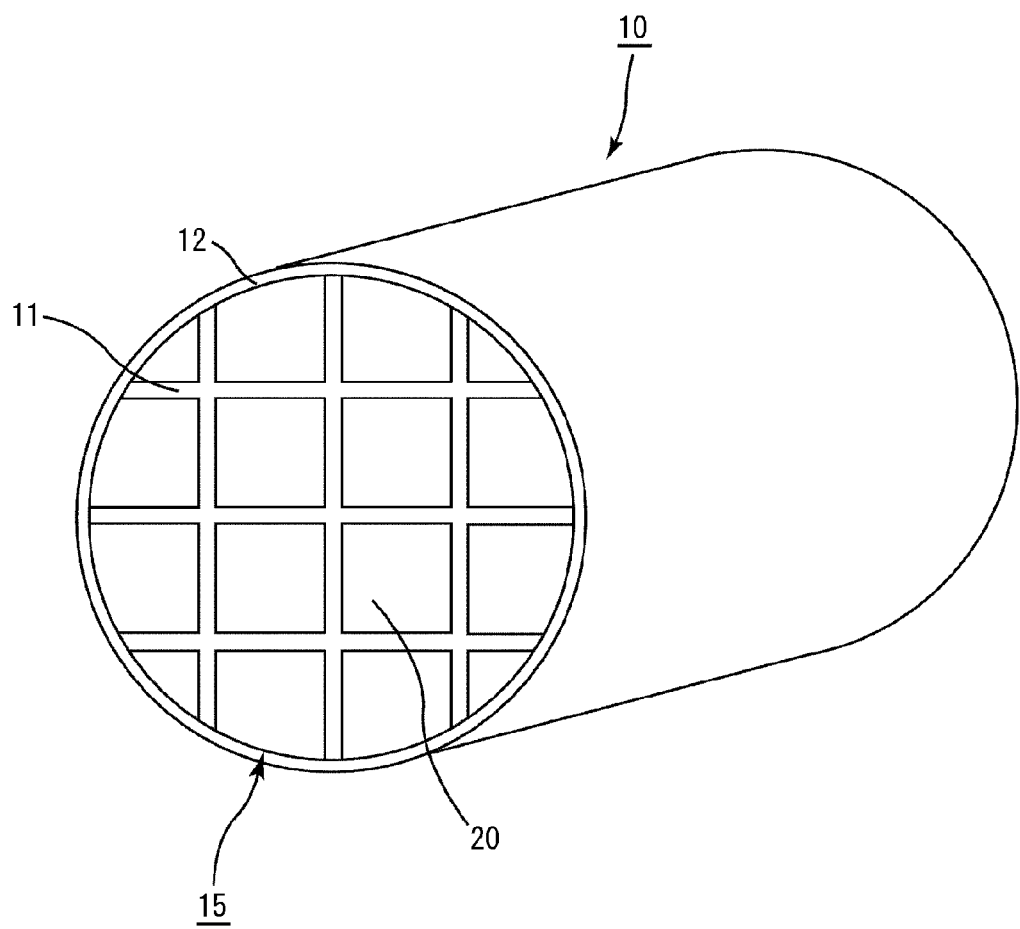
FIG. 2 is a perspective view schematically illustrating one example of a honeycomb structure according to the first embodiment of the present invention.
Figure 3A:
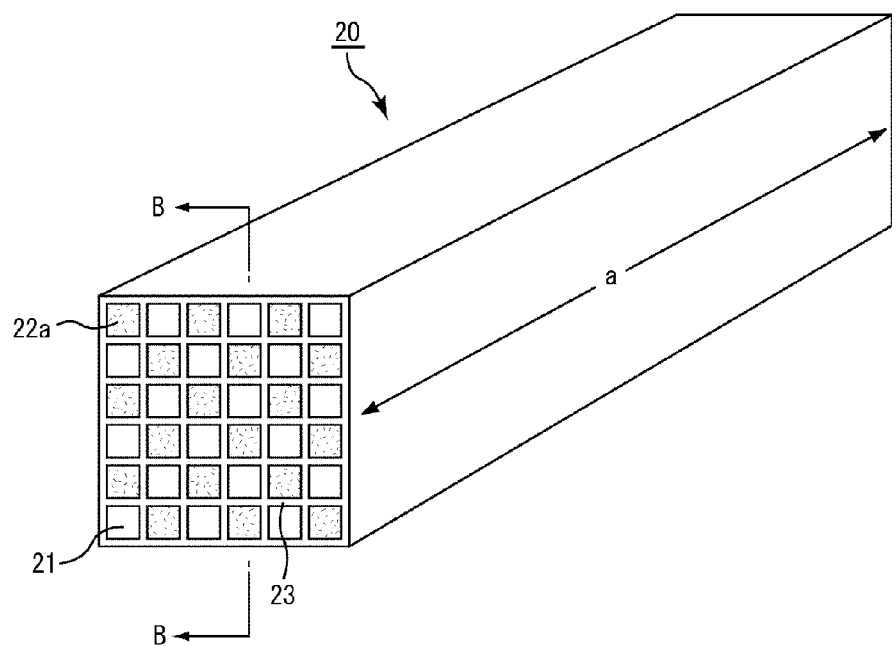
FIG. 3A is a perspective view schematically illustrating one example of a honeycomb fired body constituting the honeycomb structure according to the first embodiment of the present invention.

FIG. 2 is a perspective view schematically illustrating one example of a honeycomb structure according to the first embodiment of the present invention. FIG. 3A is a perspective view schematically illustrating one example of a honeycomb fired body constituting the honeycomb structure according to the first embodiment of the present invention, and FIG. 3B is a B-B line cross-sectional view thereof.

In the honeycomb structure 10 of the present embodiment, as shown in FIG. 2, the plurality of honeycomb fired bodies 20 are combined with one another with the adhesive layer 11 interposed therebetween to form a honeycomb block 15. Additionally, the coat layer 12 is formed on the periphery of the honeycomb block 15.

Figure 3B:
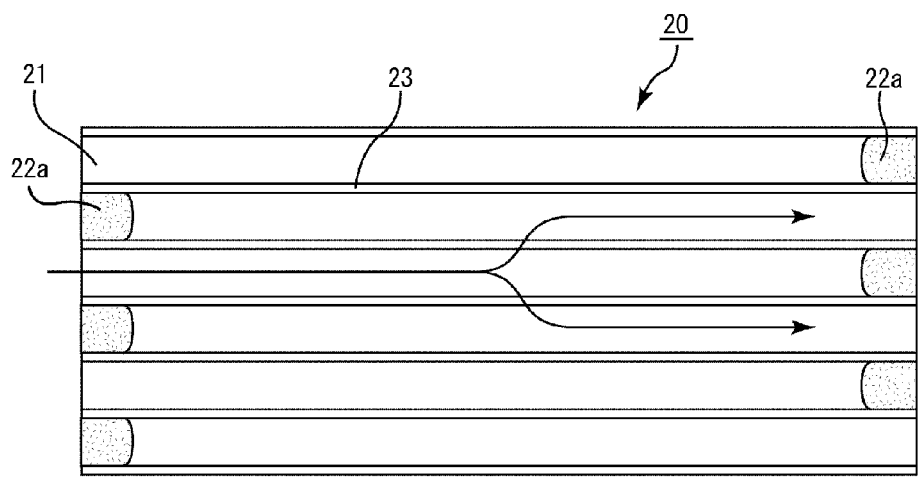
FIG. 3B is a B-B line cross-sectional view thereof.

Moreover, as shown in FIGS. 3A and 3B, the honeycomb fired body 20 has a configuration in which a large number of cells 21 are placed in parallel with one another in the longitudinal direction (direction of arrow a in FIG. 3A). The cell wall 23 partitioning the cells 21 functions as a filter.

That is, as shown in FIG. 3B, each of the cells 21 formed in the honeycomb fired body 20 is sealed either on the exhaust-gas inlet side with the plug portion 22a formed by the solidified plug material paste, or on the exhaust-gas outlet side with the plug portion 22a formed by the solidified plug material paste. Therefore, exhaust gases that have flowed in one cell 21 having a sealed end on the exhaust-gas outlet side, are discharged from another cell 21 having a sealed end on the exhaust-gas inlet side, after having always passed through the cell wall 23 partitioning the cells 21. When the exhaust gases pass through the cell wall 23, PM is captured in the cell wall 23 so that the exhaust gases are purified.

In FIG. 3B, arrows indicate exhaust gas flows.

In the honeycomb structure 10, the adhesive layer 11 and the coat layer 12 are formed by using almost the same paste as the plug material paste used for forming the plug portions 22a.

In the present description, the solidification refers to a process in which, by removing moisture and the like in the composition, the state of the composition is changed by physical actions to exert an adhesive property (to improve the hardness of the composition) without allowing any reactions among the respective components in the composition to take place. However, the firing refers to a process in which instable components (moisture, binder, and the like) in the molded body are decomposed and removed, and reactions (including recrystallizing) among the respective components are allowed to progress to form a stable compound. The firing further improves the strength.

The above-described honeycomb structure can be used in an exhaust-gas-purifying apparatus.

The following description will briefly describe an exhaust-gas-purifying apparatus provided with a honeycomb structure manufactured by the method for manufacturing a honeycomb structure of the present embodiment.

Figure 4:
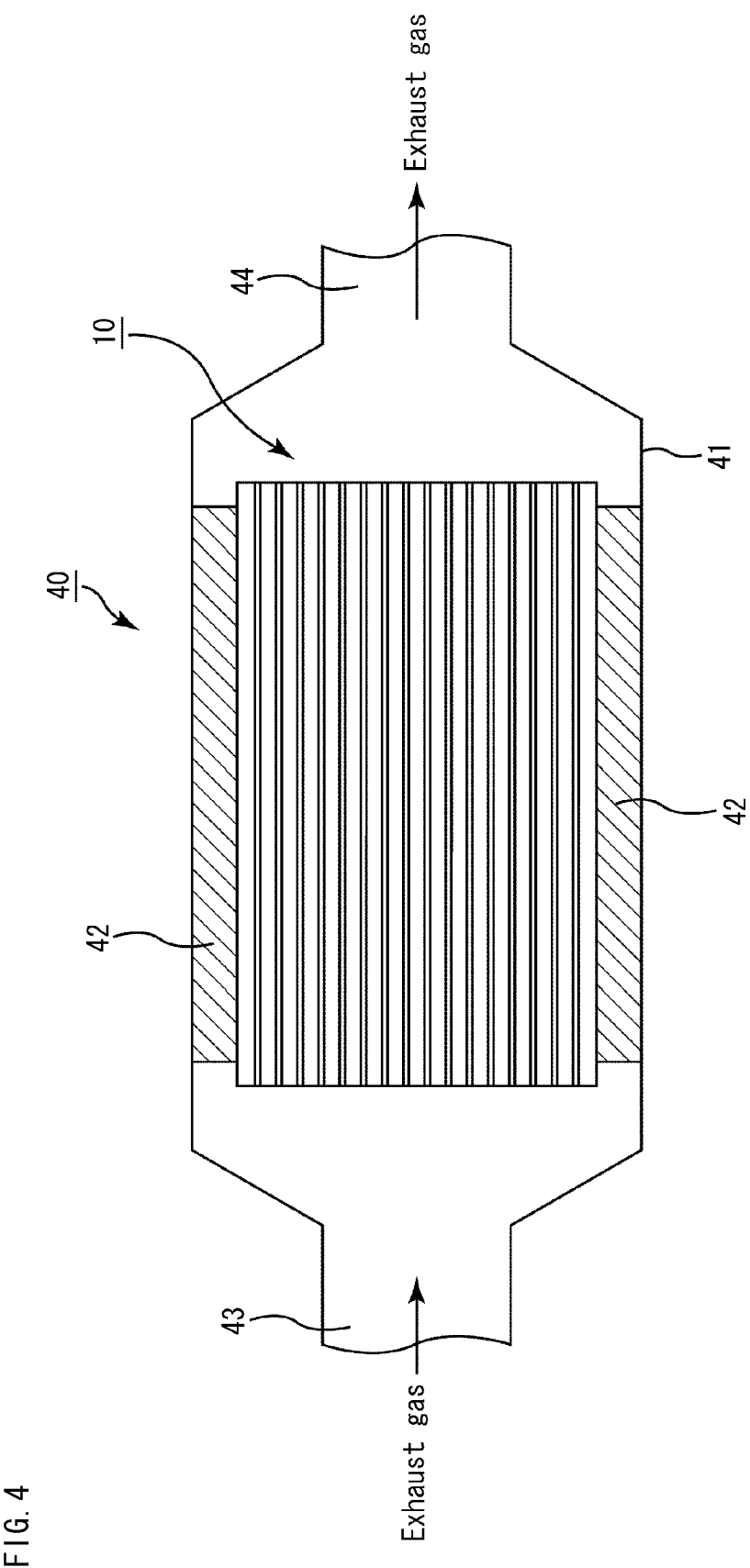
FIG. 4 is a cross-sectional view schematically illustrating one example of an exhaust-gas-purifying apparatus in which a honeycomb structure is installed.

FIG. 4 is a cross-sectional view schematically illustrating one example of an exhaust-gas-purifying apparatus in which a honeycomb structure according to one embodiment of the present invention is installed.

As shown in FIG. 4, an exhaust-gas-purifying apparatus 40 is mainly configured by a honeycomb structure 10, a casing (metal container) 41 that covers the outside of the honeycomb structure 10 and a holding sealing material 42 made of alumina interposed between the honeycomb structure 10 and the casing 41. An introducing pipe 43 coupled to an internal combustion engine such as an engine, is connected to an end of the casing 41 on the side from which exhaust gases are introduced. An exhaust pipe 44 coupled to the outside is connected to the other end of the casing 41.

In FIG. 4, arrows indicate exhaust-gas flows.

In the exhaust-gas-purifying apparatus 40 having such a configuration, exhaust gases discharged from the internal combustion engine such as an engine are introduced into the casing 41 through the introducing pipe 43, and allowed to flow into the honeycomb structure 10 from the cells having an opening on the inlet side. Thereafter, the exhaust gases pass through the cell wall, and PM is captured in the cell wall to purify the exhaust gases. Then, the purified gases are discharged out of the honeycomb structure from the cells having an opening on the outlet side, and discharged the outside through the exhaust pipe 44.

When a large amount of PM is accumulated on the cell walls of the honeycomb structure 10 to cause an increase in the pressure loss, a regenerating process of the honeycomb structure 10 is carried out.

In the regenerating process, gases heated by a heater (not shown) are allowed to flow in the cells of the honeycomb structure. Thereby, the honeycomb structure 10 is heated, and the PM accumulated on the cell walls are burned and eliminated. Alternatively, the PM may be burned and eliminated by using a post-injection system.

The following description will explain the effects of the first embodiment of the present invention.

(1) In the present embodiment, upon manufacturing a honeycomb structure, after the firing treatment is carried out on a honeycomb molded body to manufacture a honeycomb fired body, the resulting honeycomb fired body is cut.

By carrying out the cutting treatment after the firing treatment as described above, it is possible to manufacture honeycomb fired bodies each having superior dimensional accuracy in the longitudinal direction, thus more likely leading to a smaller variation in the size of the honeycomb fired bodies. Therefore, the present embodiment can be suitably used for manufacturing a honeycomb structure that has little irregularity on the end faces and does not particularly need a grinding treatment.

Moreover, since after a honeycomb fired body is manufactured, the resulting honeycomb fired body is cut, two honeycomb fired bodies may be manufactured more easily from a single honeycomb molded body. Therefore, it is possible to efficiently manufacture honeycomb fired bodies. As a result, the productivity of the honeycomb structure is improved, and the number of honeycomb structure manufactured per unit time tends to be increased, leading to a reduction in the manufacturing costs.

(2) In the present embodiment, since a plug material paste is injected and then solidified to form plug portions for sealing a predetermined end of each cell, the predetermined end of each cell tends to be positively sealed.

(3) In the present embodiment, since the plug portions, the adhesive layer and the coat layer which constitute the honeycomb structure are formed by using almost the same materials, an inner stress caused by a difference between the thermal expansion coefficients of the component members is less likely to occur in the manufactured honeycomb structure. Therefore, it is possible to further improve the reliability.

(4) In the present embodiment, since a coat layer is formed on the periphery of the honeycomb block, it may be easier to prevent PM leakage from the peripheral side faces of the honeycomb structure when the honeycomb structure is used for purifying exhaust gases, leading to improvement of the reliability.

EXAMPLES

Hereinafter, an example that discloses the first embodiment of the present invention more specifically is shown, but the present invention is not limited to this example.

Example 1

(1) An amount of 52.8% by weight of a silicon carbide coarse powder having an average particle diameter of 22 μm and an amount of 22.6% by weight of a silicon carbide fine powder having an average particle diameter of 0.5 μm are mixed, and to the obtained mixture are added 2.1% by weight of an acrylic resin, 4.6% by weight of an organic binder (methyl cellulose), 2.8% by weight of a lubricant (UNILUB, manufactured by NOF Corp.), 1.3% by weight of glycerin, and 13.8% by weight of water, and then mixed and kneaded to obtain a wet mixture. The wet mixture is then extrusion-molded to provide raw honeycomb molded bodies having almost the same shape as that shown in FIG. 3A with the cells unsealed.

(2) Subsequently, the raw honeycomb molded bodies are dried by using a microwave drying apparatus to obtain dried honeycomb molded bodies. Next, the dried honeycomb molded bodies are placed on a firing jig, and then degreased at a temperature of 400° C. Thereafter, firing treatment is carried out at a temperature of 2200° C. under a normal-pressure argon atmosphere for 3 hours to manufacture honeycomb fired bodies including a silicon carbide sintered body. The manufactured honeycomb fired bodies has a porosity of 45%, an average pore diameter of 15 μm, a size of 34.3 mm×34.3 mm×300.5 mm, the number of cells (cell density) of 46.5 pcs/cm$^2$ (300 cpsi) and a thickness of a cell wall of 0.25 mm (10 mil).

(3) Next, each of the honeycomb fired bodies are cut into two equal pieces by using an OD diamond blade having a board thickness of 0.5 mm to obtain honeycomb fired bodies having a size of 34.3 mm×34.3 mm×150 mm.

(4) A plug material paste is injected to end portions of predetermined cells to seal each cell at either one end thereof. Thereafter, the plug material paste injected in the process is solidified by heating with a hot air at 180° C. for 15 minutes to form plug portions.

Here, as the plug material paste, a plug material paste containing 30.0% by weight of a silicon carbide powder having an average particle diameter of 0.6 µm, 21.4% by weight of silica sol, 8.0% by weight of carboxymethyl cellulose and 40.6% by weight of water is used.

(5) Next, an adhesive paste is applied to side faces of the honeycomb fired bodies manufactured through the processes (1) to (4), and 16 pieces of the honeycomb fired bodies are bonded to one another with the adhesive paste interposed therebetween. Furthermore, the adhesive paste is solidified at 180° C. for 20 minutes to manufacture a rectangular pillar-shaped aggregated body of the honeycomb fired bodies. Subsequently, the periphery of the aggregated body of the honeycomb fired bodies is cut by using a diamond cutter to manufacture a round pillar-shaped honeycomb block with the adhesive layer having a thickness of 1 mm.

Here, as the adhesive paste, a paste having the same composition as that of the plug material paste used in the process (4) is used.

(6) Next, a coating material paste is applied to the periphery of the honeycomb block to form a coating material paste layer. Then, the coating material paste layer is solidified at 180° C. for 20 minutes to manufacture a round pillar-shaped honeycomb structure having a size of 143.8 mm in diameter× 150 mm in length with a coat layer formed on the periphery.

Here, a paste having the same composition as that of the plug material paste used in the process (4) is used as the coating material paste.

Comparative Example 1

(1) Raw honeycomb molded bodies having almost the same shape as that shown in FIG. 3A with the cells unsealed are manufactured by following the same procedure as in the process (1) of Example 1, except that the manufactured raw honeycomb molded bodies are designed to have a half longitudinal length.

(2) Next, the raw honeycomb molded bodies are dried by using a microwave drying apparatus to form dried honeycomb molded bodies. Thereafter, a plug material paste is injected to end portions of predetermined cells to seal each cell at either one end.

Here, a composition having the same composition as that of the wet mixture for manufacturing a molded body is used as the plug material paste.

(3) Next, the degreasing treatment and the firing treatment are carried out on the honeycomb molded bodies with the plug material paste filled therein under the same conditions as those in the process (2) of Example 1 to manufacture honeycomb fired bodies.

Here, each of the manufactured honeycomb fired bodies includes a silicon carbide sintered body and has a porosity of 45%, an average pore diameter of 15 µm, a size of 34.3 mm×34.3 mm×150 mm, the number of cells (cell density) of 46.5 pcs/cm$^2$ (300 cpsi) and a thickness of a cell wall of 0.25 mm (10 mil).

(4) Next, by using the honeycomb fired bodies manufactured in the process (3), a honeycomb structure including a plurality of the honeycomb fired bodies combined with one another with an adhesive layer interposed therebetween is manufactured by following the same method as in the processes (5) and (6) of Example 1.

(Evaluation of Honeycomb Structure)

(1) Measurement of Pressure Loss

An exhaust-gas-purifying apparatus 40 shown in FIG. 4 is assembled using each of the honeycomb structure manufactured in Example 1 and Comparative Example 1. Then, a 2 L common-rail-type diesel engine is coupled to an introduction pipe 43 of the exhaust-gas-purifying apparatus 40. Pressure gauges are attached in front of and behind the honeycomb structure.

The engine is driven at the number of revolutions of 1500 min-1 and a torque of 50 Nm. A pressure difference is measured five minutes after the start of the driving operation.

(2) Measurement of Regeneration Limit Value

An exhaust-gas-purifying apparatus 40 shown in FIG. 4 is assembled using each of the honeycomb structure manufactured in Example 1 and Comparative Example 1. Then, a 2 L common-rail-type diesel engine is coupled to an introduction pipe 43 of the exhaust-gas-purifying apparatus 40.

An experiment in which the engine is driven at the number of revolutions of 2000 min-1 and a torque of 50 Nm for a predetermined time period and a regenerating process is carried out is successively conducted while increasing the time period of the operation, and the honeycomb structure (especially, the plug portions) is observed whether cracks had occurred.

The amount of PM having been captured upon the occurrence of cracks is defined to be regeneration limit value.

The honeycomb structure manufactured in Example 1 shows the similar degree of the pressure loss and the regeneration limit value to those of the honeycomb structure manufactured in Comparative Example 1 (conventional method).

Second Embodiment

In the present embodiment, the sequence of the processes in the method for manufacturing a honeycomb structure is different from the sequence of the processes in the method for manufacturing a honeycomb structure of the first embodiment of the present invention.

FIGS. 5A to 5F are explanatory views each illustrating manufacturing processes of the second embodiment of the present invention.

Figure 5A:
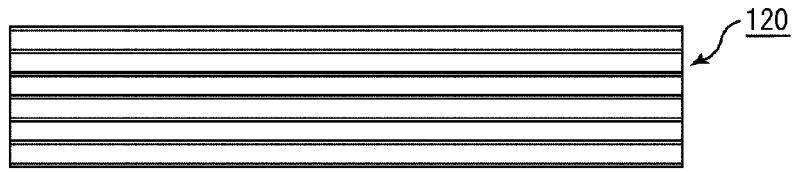
FIGS. 5A to 5F are explanatory views each illustrating manufacturing processes of the second embodiment of the present invention.

(1) In the method for manufacturing a honeycomb structure of the present embodiment, first, honeycomb fired bodies 120 with no plug portion formed in any cells are manufactured by following the same procedure as in the processes (1) to (3) of the method for manufacturing a honeycomb structure of the first embodiment (see FIG. 5A).

(2) Next, an adhesive paste for forming an adhesive layer is applied to side faces of the honeycomb fired bodies 120 manufactured in the process (1) to form an adhesive paste layer. Repeatedly another honeycomb fired body is laminated on the adhesive paste layer to manufacture an aggregated body 110' of the honeycomb fired bodies in which a predetermined number of the honeycomb fired bodies are combined with one another.

Figure 5B:
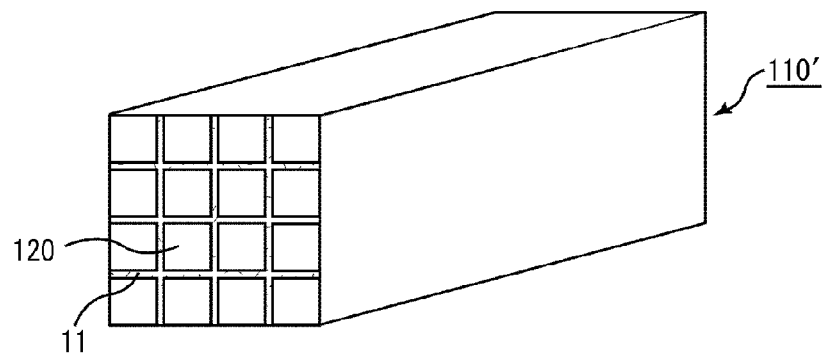
Figure 5C:
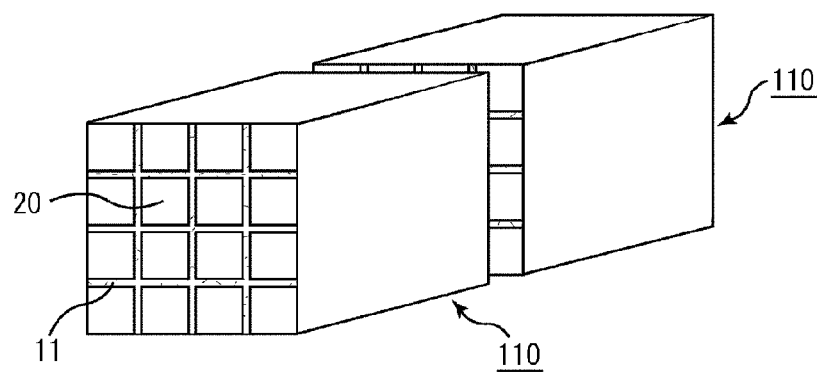

Subsequently, the adhesive paste layer is solidified to form an adhesive layer 11 by heating the aggregated body of the honeycomb fired bodies (see FIG. 5B).

Here, as the adhesive paste, for example, an adhesive paste containing an inorganic binder, an organic binder and inorganic particles is used. The adhesive paste may further contain at least one of inorganic fibers and whiskers.

(3) Next, the aggregated body 110' of the honeycomb fired bodies manufactured in the process (2) is cut into two pieces having an equal longitudinal length to obtain aggregated bodies 110 of the honeycomb fired bodies by using a diamond cutter, an OD diamond blade, an ID diamond blade, a multi-wire, a multi-blade or the like. The obtained aggregated bodies 110 of the honeycomb fired bodies have a longitudinal length almost equal to a designed value of a longitudinal length of a honeycomb structure to be manufactured (see FIG. 5C).

(4) Subsequently, the plug material paste is injected to end portions of cells to seal each cell at either one end thereof. Additionally, the injected plug material paste is solidified by heating to form plug portions (FIGS. 5D and 5E).

Figure 5D:
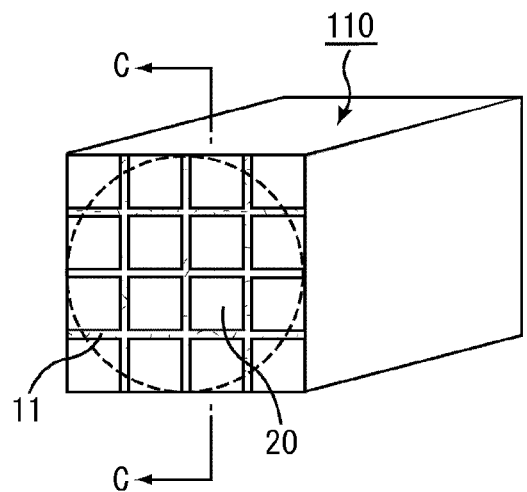
Figure 5E:
Figure 5F:
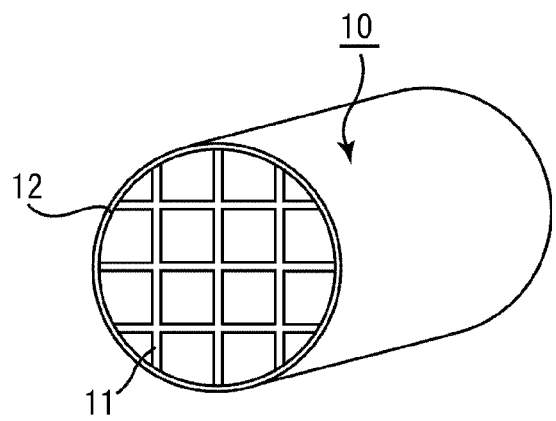

FIG. 5E is a partially enlarged C-C line cross-sectional view of FIG. 5D.

Here, as the plug material paste, a paste having almost the same composition as that of the adhesive paste used in the process (2) is used.

(5) Next, cutting treatment is carried out along a broken line in FIG. 5D as following the same procedure as in the process (7) of the first embodiment of the present invention, and a coat layer 12 is formed. Thus, a honeycomb structure 10 is manufactured (see FIG. 5F).

Here, as the coating material paste used for forming the coat layer, a paste having almost the same composition as that of the plug material paste used in the process (4) is used.

In the present embodiment, a honeycomb structure in which the plug portions on both ends are formed by the solidified plug material paste can be manufactured through the processes as described above.

Here, the configuration of the honeycomb structure manufactured in the present embodiment is the same as the configuration of the honeycomb structure manufactured in the first embodiment of the present invention.

The honeycomb structure according to the second embodiment can exert the same effects as those of the first embodiment.

Examples

Hereinafter, an example that discloses the second embodiment of the present invention more specifically is shown, but the present invention is not limited to the example.

Example 2

(1) Honeycomb fired bodies including a silicon carbide sintered body and having a porosity of 45%, an average pore diameter of 15 μm, a size of 34.3 mm×34.3 mm×300.5 mm, the number of cells (cell density) of 46.5 pcs/cm$^2$ (300 cpsi) and a thickness of a cell wall of 0.25 mm (10 mil) are manufactured by following the same procedure as in the processes (1) and (2) of Example 1.

(2) Next, an adhesive paste is applied to side faces of the honeycomb fired bodies manufactured through the process (1), and 16 pieces of the honeycomb fired bodies are bonded to one another with the adhesive paste interposed therebetween. Furthermore, the adhesive paste is solidified at 180° C. to manufacture a rectangular pillar-shaped aggregated body of the honeycomb fired bodies.

Here, as the adhesive paste, an adhesive paste containing 30.0% by weight of a silicon carbide powder having an average particle diameter of 0.6 μm, 21.4% by weight of silica sol, 8.0% by weight of carboxymethyl cellulose and 40.6% by weight of water is used.

(3) Subsequently, the aggregated body of the honeycomb fired bodies is cut by using an OD diamond blade having a board thickness of 0.5 mm into two equal pieces to obtain aggregated bodies of the honeycomb fired bodies having a longitudinal length of 150 mm.

(4) Next, a plug portion is formed at either one end of each cell by following the same procedure as in the process (4) of Example 1.

Here, as the plug material paste, a paste having the same composition as that of the adhesive paste used in the process (2) is used.

(5) Next, the periphery of the aggregated body of the honeycomb fired bodies is cut by using a diamond cutter to manufacture a round pillar-shaped honeycomb block with the adhesive layer having a thickness of 1 mm, and a coat layer is formed by following the same procedure as in the process (6) of Example 1. Thus, a honeycomb structure is manufactured.

Here, as the coating material paste, a paste having the same composition as that of the plug material paste used in the process (4) is used.

The honeycomb structure to be manufactured in Example 2 shows the similar degree of the pressure loss and the regeneration limit value to those of the honeycomb structure to be manufactured in Comparative Example 1.

Third Embodiment

In the present embodiment, the sequence of the processes in the method for manufacturing a honeycomb structure is different from the sequence of the processes in the method for manufacturing a honeycomb structure of the first embodiment of the present invention.

FIGS. 6A to 6F are explanatory views each illustrating manufacturing processes of the third embodiment of the present invention.

(1) In the method for manufacturing a honeycomb structure of the present embodiment, first, honeycomb fired bodies 20 each having a longitudinal length equal to a designed value of a longitudinal length of a honeycomb structure to be manufactured are manufactured by following the same procedure as in the processes (1) to (4) of the method for manufacturing a honeycomb structure of the first embodiment of the present invention. In the manufactured honeycomb fired bodies, plug portions are not formed in any cells (see FIGS. 6A and 6B).

(2) Next, a plurality of the honeycomb fired bodies 20 manufactured in the process (1) are combined with one another with an adhesive layer 11 interposed therebetween by following the same procedure as in the process (6) of the first embodiment of the present invention, so that an aggregated body 110 of the honeycomb fired bodies is manufactured.

Figure 6A:
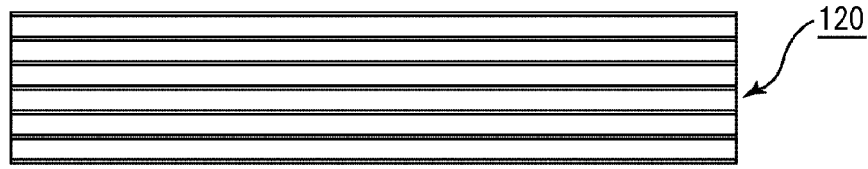
FIGS. 6A to 6F are explanatory views each illustrating manufacturing processes of the third embodiment of the present invention.
Figure 6B:
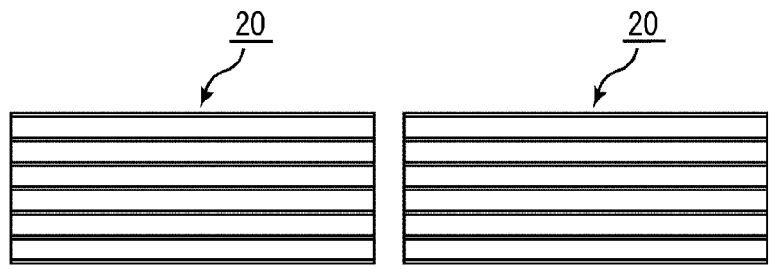
Figure 6C:
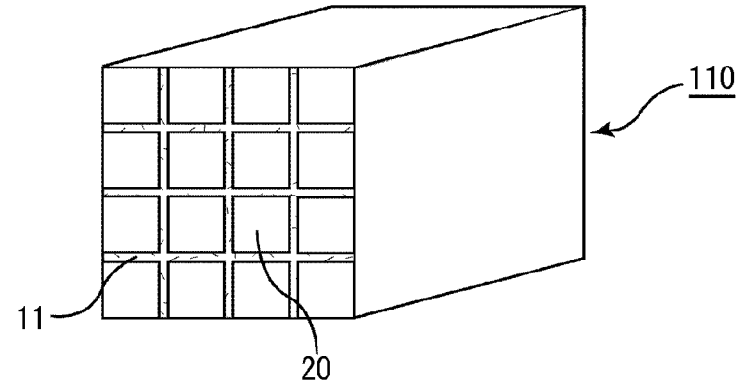
Figure 6D:
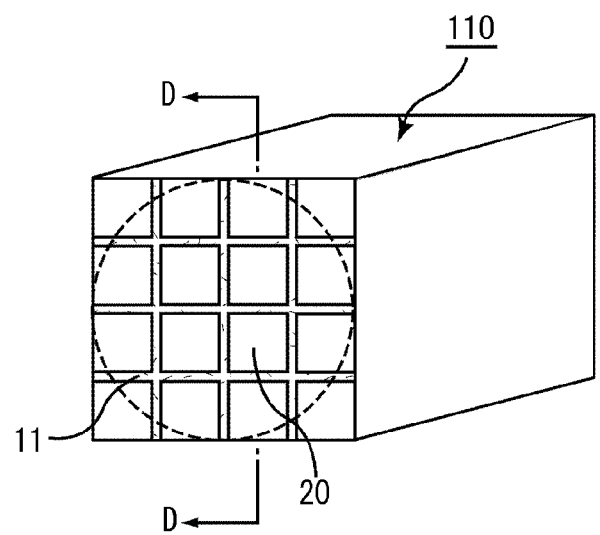

Here, as the adhesive paste, a paste having almost the same composition as the composition of a plug material paste used in the following process (3) is used (see FIG. 6C).

(3) Next, in the aggregated body 110 of the honeycomb fired bodies, the plug material paste is injected to end portions of cells 21 to seal each cell 21 at either one end. Thereafter, the injected plug material paste is solidified by heating to form plug portions 22a (see FIGS. 6D and 6E).

Figure 6E:
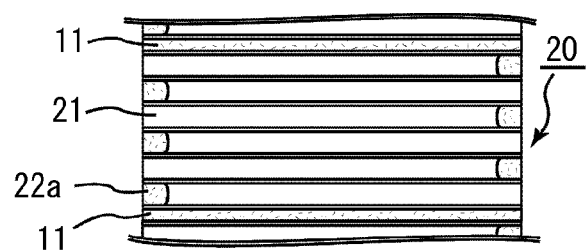
Figure 6F:
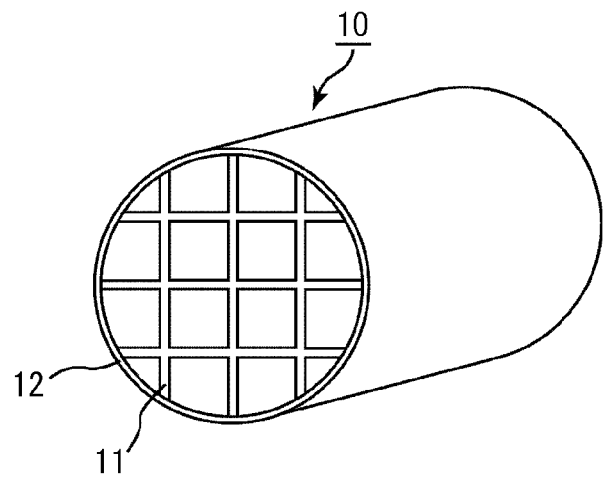

Here, as the plug material paste, the same plug material as the plug material paste injected in the process (5) of the first embodiment of the present invention is used. FIG. 6E is a partially enlarged D-D line cross-sectional view of FIG. 6D.

(4) Cutting treatment and formation of a coat layer are carried out by following the same procedure as in the process (7) of the first embodiment of the present invention. Thus, a honeycomb structure is manufactured (see FIG. 6F).

Here, as the coating material paste, a paste having almost the same composition as that of the plug material paste used in the process (3) is used.

In the present embodiment, a honeycomb structure in which the plug portions on both ends are formed by the solidified plug material paste can be manufactured through the processes as described above.

Here, the configuration of the honeycomb structure manufactured in the present embodiment is the same as the configuration of the honeycomb structure manufactured in the first embodiment of the present invention.

The honeycomb structure according to the third embodiment of the present invention can exert the same effects as those of the first embodiment of the present invention.

Examples

Hereinafter, an example that discloses the third embodiment of the present invention more specifically is shown, but the present invention is not limited to the example.

Example 3

(1) First, honeycomb fired bodies having a size of 34.3 mm×34.3 mm×150 mm are manufactured by following the same procedure as in the processes (1) to (3) of Example 1.

(2) Next, an adhesive paste is applied to side faces of the honeycomb fired bodies manufactured through the process (1), and 16 pieces of the honeycomb fired bodies are bonded to one another with the adhesive paste interposed therebetween. Furthermore, the adhesive paste is solidified at 180° C. for 20 minutes to manufacture a rectangular pillar-shaped aggregated body of the honeycomb fired bodies.

Here, as the adhesive paste, an adhesive paste containing 30.0% by weight of a silicon carbide powder having an average particle diameter of 0.6 µm, 21.4% by weight of silica sol, 8.0% by weight of carboxymethyl cellulose and 40.6% by weight of water is used.

(3) A plug portion is formed in either one end of the respective cells by following the same procedure as in the process (4) of Example 1.

Here, as the plug material paste, a paste having the same composition as that of the adhesive paste used in the process (2) is used.

(4) Next, the periphery of the aggregated body of the honeycomb fired bodies is cut by using a diamond cutter to manufacture a round pillar-shaped honeycomb block with the adhesive layer having a thickness of 1 mm, and a coat layer is formed by following the same procedure as in the process (6) of Example 1. Thus, a honeycomb structure is manufactured.

Here, as the coating material paste, a paste having the same composition as that of the plug material paste used in the process (3) is used.

The honeycomb structure manufactured in Example 3 shows the similar degree of the pressure loss and the regeneration limit value to those of the honeycomb structure manufactured in Comparative Example 1.

Although the processes for manufacturing a honeycomb structure according to the first to third embodiments of the present invention described above are different, the honeycomb structure manufactured in the respective embodiments have the same configurations.

Figure 7:
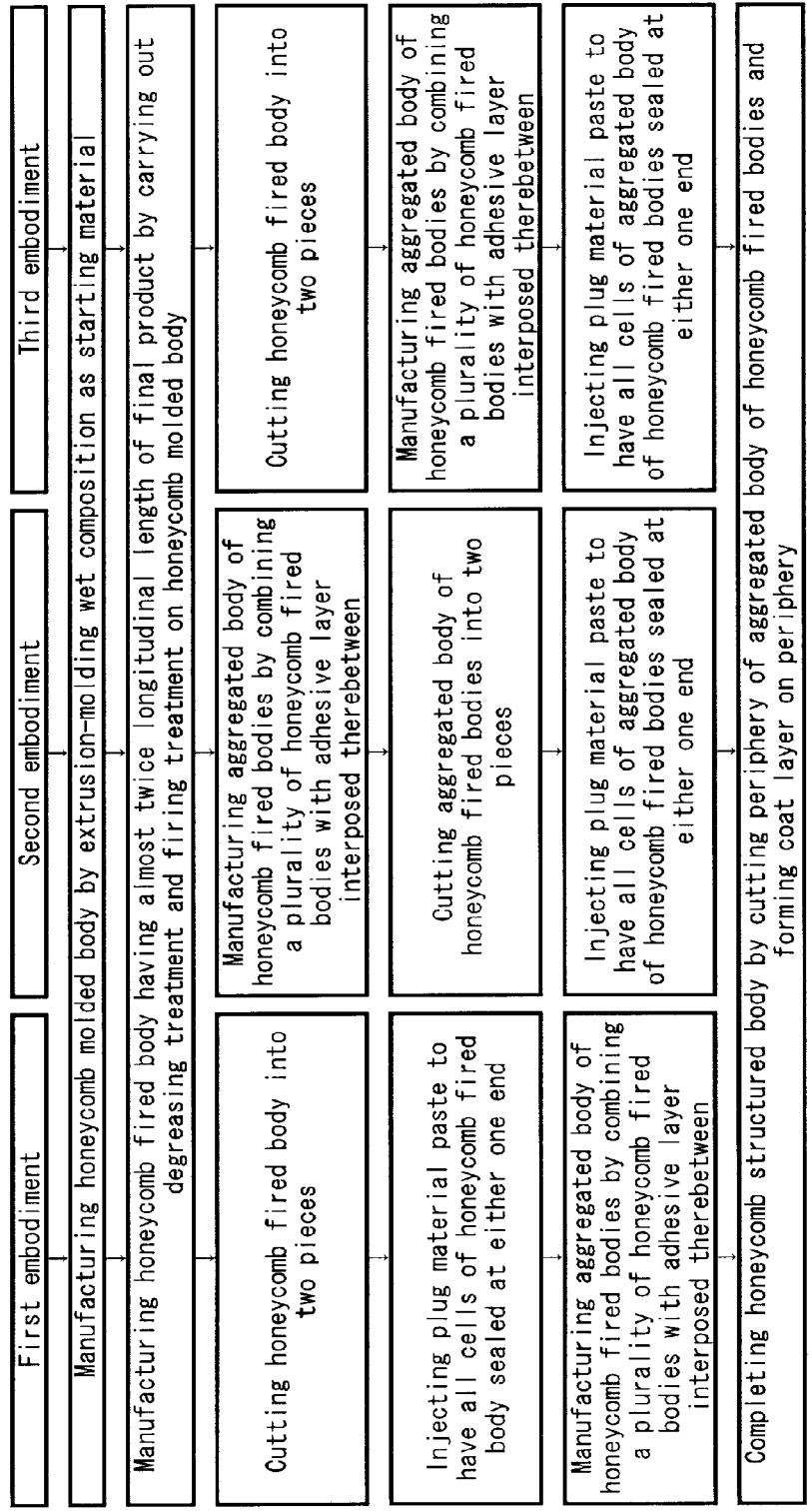
FIG. 7 is a flow chart of the methods for manufacturing a honeycomb structure according to the first to third embodiments of the present invention.

The processes of the methods for manufacturing a honeycomb structure according to the respective embodiments of the present invention are shown in FIG. 7.

FIG. 7 is a flow chart of the methods for manufacturing a honeycomb structure according to the first to third embodiments of the present invention.

As shown in FIG. 7, the timing for cutting the honeycomb fired bodies, the timing for combining the plurality of honeycomb fired bodies and the timing for injecting the plug material paste to the cells of the honeycomb fired bodies obtained by cutting are different among the methods for manufacturing a honeycomb structure according to the first to third embodiments of the present invention.

Fourth Embodiment

First, the following description will discuss a method for manufacturing a honeycomb structure in accordance with the present embodiment in the order of processes.

FIGS. 8A to 8G are explanatory views each illustrating manufacturing processes of the fourth embodiment of the present invention.

(1) As a ceramic raw material, silicon carbide powders having different average particle diameters are used and mixed with an organic binder, a plasticizer, a lubricant and water to prepare a wet mixture used for manufacturing a molded body.

Figure 8A:
FIGS. 8A to 8G are explanatory views each illustrating manufacturing processes of the fourth embodiment of the present invention.

(2) The wet mixture is charged into an extrusion-molding apparatus and extrusion-molded to form a honeycomb molded body 130 having a predetermined shape (see FIG. 8A). Here, an extrusion-molding die that forms each cell into a predetermined shape is selected.

Here, the honeycomb molded body 130 is manufactured to have a longitudinal length almost twice as long as a designed value of a longitudinal length of a honeycomb structure to be manufactured. At this time, the length of the honeycomb molded body is determined in consideration of the amount of shrinkage at the time of firing and a cutting margin to be cut out.

Moreover, the honeycomb molded body is dried by using a drying apparatus.

(3) Next, a predetermined amount of a plug material paste is injected into a predetermined end portion of each cell of the honeycomb molded body 130 to seal the respective cells. Upon sealing the cells, a sealing mask is applied to an end face of the honeycomb molded body, and the plug material paste is injected only into the cells needed to be sealed.

Here, the plug material paste is injected in such a manner that the cells are sealed in a checkered pattern on each end face and each cell is sealed only at either one end thereof.

The plug material paste may be injected in such a manner that the cells are sealed in a checkered pattern on each end face, and some cells are sealed at both ends and the other cells are not sealed at either end.

Here, a composition having almost the same composition as that of the wet mixture is used as the plug material paste.

(4) After the honeycomb molded body having cells each being sealed at a predetermined end is placed on a firing jig, degreasing treatment is carried out to decompose and remove the organic components in the honeycomb molded body by heating the honeycomb molded body in a degreasing furnace.

Figure 8B:
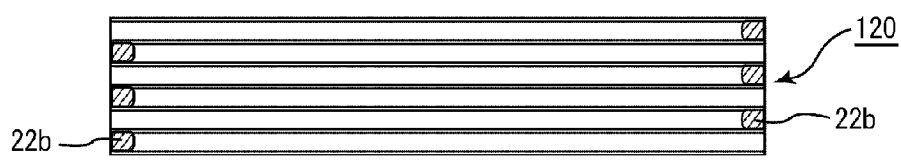

Subsequently, the degreased honeycomb molded body is charged into a firing furnace while being on the firing jig, and firing treatment is carried out at a predetermined temperature (for example, at least about 2200° C. and at most about 2300° C.) to manufacture a honeycomb fired body 120 (see FIG. 8B).

Here, plug portions 22b formed on both ends of the honeycomb fired body are formed by the fired plug material paste.

(5) Next, the honeycomb fired body manufactured in the process (4) is cut into two pieces having an equal longitudinal length.

The honeycomb fired body is cut by using a diamond cutter, an OD diamond blade, an ID diamond blade, a multi-wire, a multi-blade or the like.

Figure 8C:
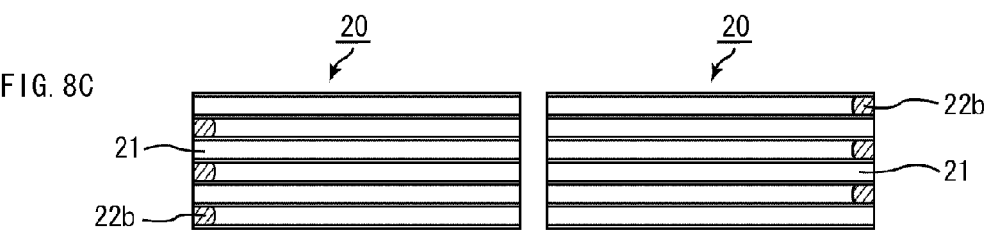

By carrying out such cutting treatment, the honeycomb fired bodies 20, which have a longitudinal length equal to a designed value of a longitudinal length of a honeycomb structure to be manufactured, can be manufactured (see FIG. 8C).

Here, in the honeycomb fired body 20 obtained by cutting, the plug portions 22b are formed in only predetermined cells on one end face side.

(6) Next, in the honeycomb fired bodies 20 manufactured through the processes (1) to (5), the plug material paste is injected to end portions of unsealed cells out of cells needed to be sealed so that each cell 21 is sealed at either one end thereof.

Here, as the plug material paste, a paste-form composition having almost the same composition as that of the wet mixture used for manufacturing a honeycomb molded body is used in the same way of the plug material paste injected in the process (3).

(7) Next, the honeycomb fired body obtained through the process (6) is fired again.

In the process, the firing treatment is carried out by following the same procedure as in the process (4).

Figure 8D:
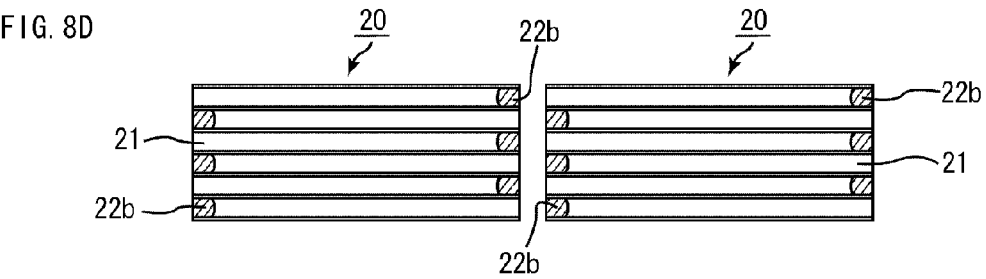

By carrying out the process, a honeycomb fired body 20 in which the plug portion 22b formed by the fired plug material paste is formed in a predetermined end of each cell 21 is manufactured (see FIG. 8D).

(8) Next, an adhesive paste for forming an adhesive layer 11 is applied to side faces of the honeycomb fired bodies with cells each sealed at a predetermined end to form an adhesive paste layer. Repeatedly another honeycomb fired body is laminated on the adhesive paste layer to manufacture an aggregated body 110 of the honeycomb fired bodies in which a predetermined number of the honeycomb fired bodies are combined with one another. Here, as the adhesive paste, for example, an adhesive paste containing an inorganic binder, an organic binder and inorganic particles is used. The adhesive paste may further contain at least one of inorganic fibers and whiskers.

Subsequently, the adhesive paste layer is solidified to form an adhesive layer 11 by heating the aggregated body of the honeycomb fired bodies (see FIGS. 8E and 8F).

Figure 8E:
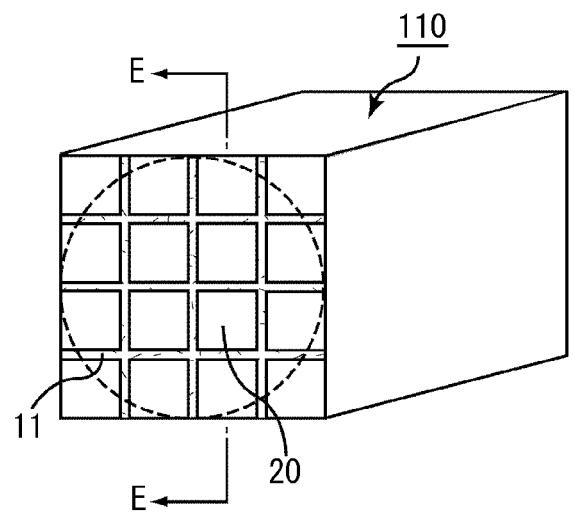
Figure 8F:
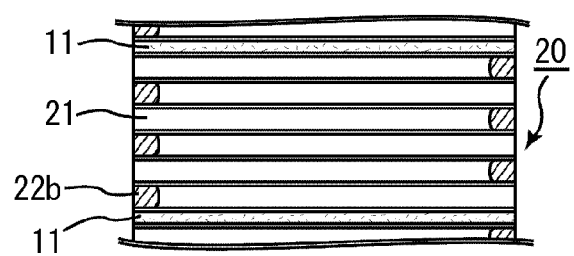
Figure 8G:
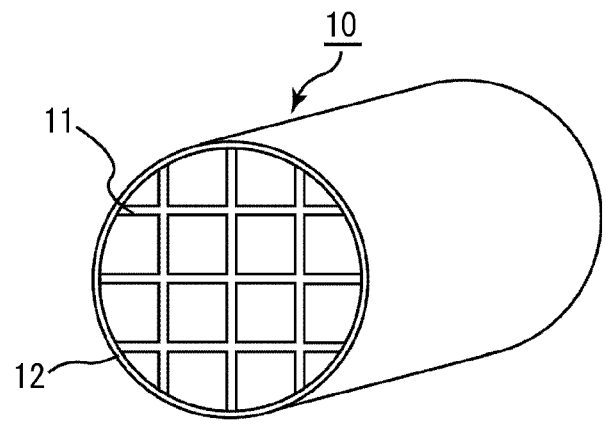

FIG. 8F is a partially enlarged E-E line cross-sectional view of FIG. 8E.

(9) Thereafter, the aggregated body 110 of the honeycomb fired bodies is cut along a broken line in FIG. 8E by using a diamond cutter and the like to form a honeycomb block. A coating material paste is applied to the periphery of the honeycomb block. The coating material paste is heated and solidified to form a coat layer 12. Thus, a honeycomb structure 10 is manufactured (see FIG. 8G).

Here, for example, a paste having almost the same composition as that of the adhesive paste used in the process (8) is used as the coating material paste.

Next, with reference to the figures, the following description will discuss a honeycomb structure according to the embodiments of the present invention manufactured by such a manufacturing method.

Figure 9A:
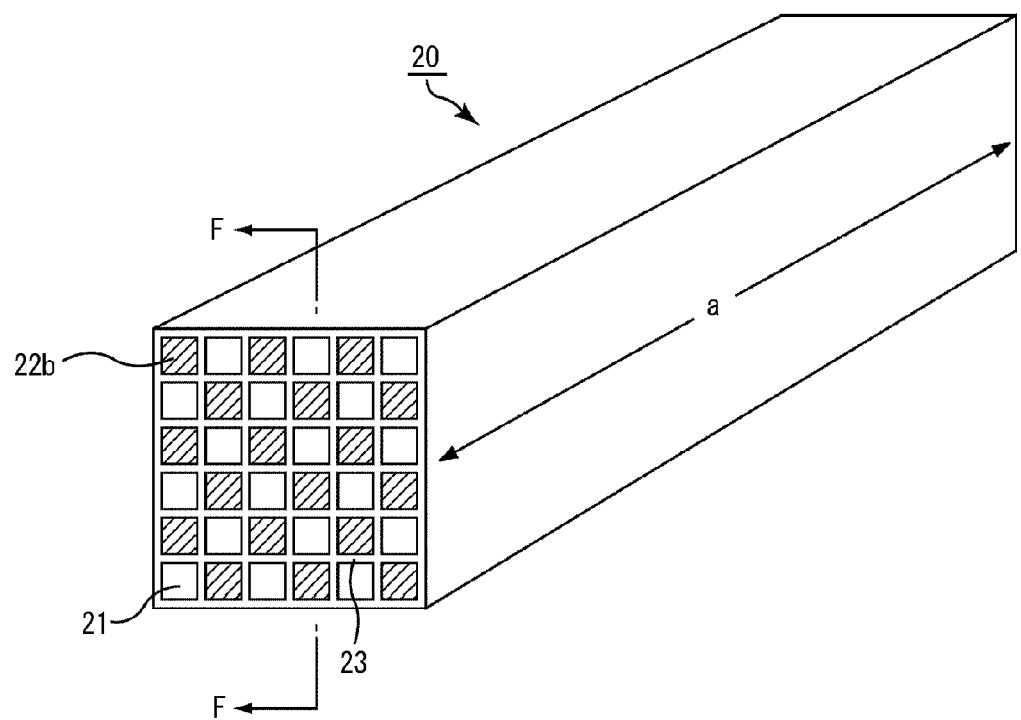
FIG. 9A is a perspective view schematically illustrating one example of a honeycomb fired body constituting the honeycomb structure according to the fourth embodiment of the present invention.
Figure 9B:
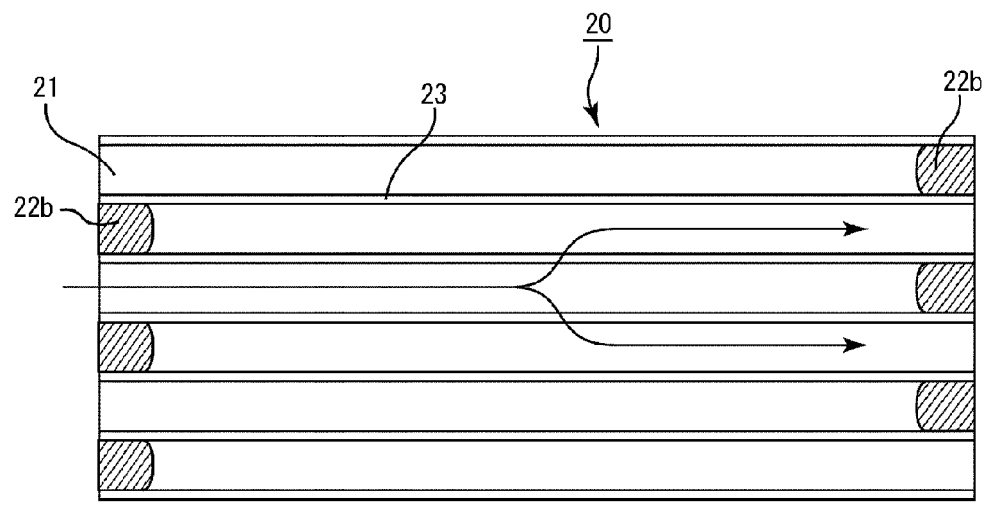
FIG. 9B is an F-F line cross-sectional view thereof.

FIG. 9A is a perspective view schematically illustrating one example of a honeycomb fired body constituting the honeycomb structure according to the fourth embodiment of the present invention, and FIG. 9B is an F-F line cross-sectional view thereof.

In the honeycomb structure of the present embodiment, like the honeycomb structure 10 shown in FIG. 2, the plurality of honeycomb fired bodies are combined with one another with the adhesive layer interposed therebetween to form a honeycomb block. Additionally, the coat layer is formed on the periphery of the honeycomb block.

Moreover, as shown in FIGS. 9A and 9B, the honeycomb fired body 20 constituting the honeycomb structure of the present embodiment has a configuration in which a large number of cells 21 are placed in parallel with one another in the longitudinal direction (direction of arrow a in FIG. 9A). The cell wall 23 partitioning the cells 21 functions as a filter.

That is, as shown in FIG. 9B, each of the cells 21 formed in the honeycomb fired body 20 is sealed either on the exhaust-gas inlet side with the plug portion 22b formed by the fired plug material paste, or on the exhaust-gas outlet side with the plug portion 22b formed by the fired plug material paste. Therefore, exhaust gases that have flowed in one cell 21 having a sealed end on the exhaust-gas outlet side, are discharged from another cell 21 having a sealed end on the exhaust-gas inlet side, after having always passed through the cell wall 23 partitioning the cells 21. When the exhaust gases pass through the cell wall 23, PM is captured in the cell wall 23 so that the exhaust gases are purified.

Here, in FIG. 9B, arrows indicate exhaust gas flows.

Therefore, the honeycomb structure manufactured in the present embodiment has the same configuration as that of the honeycomb structure manufactured in the first embodiment of the present invention, except that the plug portions sealing one end are formed through the firing treatment once, and the plug portions sealing the other end are formed through the firing treatment twice.

The following description will explain the effects of the fourth embodiment of the present invention.

(1) In the present embodiment, upon manufacturing a honeycomb structure, after the firing treatment is carried out on a honeycomb molded body to manufacture a honeycomb fired body, the resulting honeycomb fired body is cut.

By carrying out the cutting treatment after the firing treatment as described above, it is possible to manufacture honeycomb fired bodies each having superior dimensional accuracy in the longitudinal direction, thus more likely leading to a smaller variation in the size of the honeycomb fired bodies. Therefore, the present embodiment can be suitably used for manufacturing a honeycomb structure that has little irregularity on the end faces and does not particularly need a grinding treatment.

Moreover, since after a honeycomb fired body is manufactured, the resulting honeycomb fired body is cut, two honeycomb fired bodies can be manufactured from a single honeycomb molded body. Therefore, it may be easier to efficiently manufacture honeycomb fired bodies. As a result, the productivity of the honeycomb structure is improved, and the number of honeycomb structure manufactured per unit time tends to be increased, leading to a reduction in the manufacturing costs.

(2) In the present embodiment, since the plug portions for sealing an end of each cell are formed by carrying out the firing treatment once or twice on a plug material paste after the plug material paste is injected, the predetermined end of each cell can be positively sealed.

(3) In the present embodiment, since a coat layer is formed on the periphery of the honeycomb block, it may be easier to prevent PM leakage from the peripheral side faces of the honeycomb structure when the honeycomb structure is used for purifying exhaust gases, leading to improvement of the reliability.

(4) In the present embodiment, since the adhesive layer and the coat layer are formed by using almost the same materials, an inner stress caused by a difference between the thermal expansion coefficients of the component members is less likely to occur in the manufactured honeycomb structure. Therefore, it is possible to further improve the reliability.

(5) In the present embodiment, composition of the plug material paste is almost the same as composition of the ceramic raw material. In the honeycomb structure manufactured by using the plug material paste and the ceramic raw material which have the same composition, peeling or a crack between the honeycomb fired body and the plug portion is less likely to occur.

Examples

Hereinafter, an example that discloses the fourth embodiment of the present invention more specifically is shown, but the present invention is not limited to this example.

Example 4

(1) Raw honeycomb molded bodies having almost the same shape as that shown in FIG. 3A with the cells unsealed are manufactured by following the same procedure as in the process (1) of Example 1.

(2) Subsequently, the raw honeycomb molded bodies are dried by using a microwave drying apparatus to obtain dried honeycomb molded bodies. Thereafter, predetermined cells of the dried honeycomb molded bodies are filled in with a plug material paste. Specifically, the plug material paste is injected to seal each cell at either one end thereof. Thereafter, the honeycomb molded bodies are dried again by the drying apparatus.

Here, a paste having the same composition as that of the wet mixture used for manufacturing a honeycomb molded body by extrusion-molding is used as the plug material paste.

(3) Next, the dried honeycomb molded bodies are placed on a firing jig, and then degreased at a temperature of 400° C. Thereafter, firing treatment is carried out at a temperature of 2200° C. under a normal-pressure argon atmosphere for 3 hours to manufacture honeycomb fired bodies including a silicon carbide sintered body. The manufactured honeycomb fired bodies has a porosity of 45%, an average pore diameter of 15 μm, a size of 34.3 mm×34.3 mm×300.5 mm, the number of cells (cell density) of 46.5 pcs/cm² (300 cpsi) and a thickness of a cell wall of 0.25 mm (10 mil).

(4) Next, each of the honeycomb fired bodies is cut into two equal pieces by following the same procedure as in the process (3) of Example 1 to obtain honeycomb fired bodies having a size of 34.3 mm×34.3 mm×150 mm.

(5) In the honeycomb fired bodies obtained in the process (4), a plug material paste is injected to end portions of unsealed cells to seal each cell at either one end thereof.

Here, a paste having the same composition as that of the wet mixture used for manufacturing a honeycomb molded body by extrusion-molding is used as the plug material paste.

(6) Next, under the same conditions as those of the process (3), the honeycomb fired bodies are fired again. In the process, the plug material paste injected in the process (5) is fired to form plug portions.

(7) Next, an adhesive paste is applied to side faces of the honeycomb fired bodies manufactured through the processes (1) to (6), and 16 pieces of the honeycomb fired bodies are bonded to one another with the adhesive paste interposed therebetween. Thereafter, the adhesive paste is solidified at 180° C. for 20 minutes to manufacture a rectangular pillar-shaped aggregated body of the honeycomb fired bodies. Subsequently, the periphery of the aggregated body of honeycomb fired bodies is cut by using a diamond cutter. Thus, a round pillar-shaped honeycomb block with an adhesive layer having a thickness of 1 mm is manufactured.

Here, as the adhesive paste, an adhesive paste containing 30.0% by weight of a silicon carbide powder having an average particle diameter of 0.6 μm, 21.4% by weight of silica sol, 8.0% by weight of carboxymethyl cellulose and 40.6% by weight of water is used.

(8) Next, a coating material paste is applied to the periphery of the honeycomb block to form a coating material paste layer. Then, the coating material paste layer is dried at 180° C. for 20 minutes to manufacture a round pillar-shaped honeycomb structure having a size of 143.8 mm in diameter×150 mm in length with a coat layer formed on the periphery.

Here, a paste having the same composition as that of the adhesive paste used in the process (7) is used as the coating material paste.

In the honeycomb structure manufactured in Example 4, plug portions on one end face side are formed through the firing treatment once, however, plug portions on the other end face side are formed through the firing treatment twice.

The honeycomb structure to be manufactured in Example 4 shows the similar degree of the pressure loss and the regeneration limit value to those of the honeycomb structure to be manufactured in Comparative Example 1.

Fifth Embodiment

In the present embodiment, the sequence of the processes in the method for manufacturing a honeycomb structure is different from the sequence of the processes in the method for manufacturing a honeycomb structure of the fourth embodiment of the present invention.

FIGS. 10A to 10G are explanatory views each illustrating manufacturing processes of the fifth embodiment of the present invention.

Figure 10A:
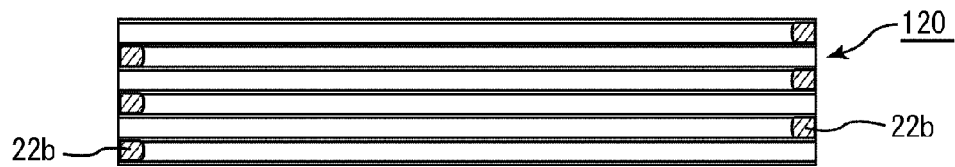
FIGS. 10A to 10G are explanatory views each illustrating manufacturing processes of the fifth embodiment of the present invention.
Figure 10B:
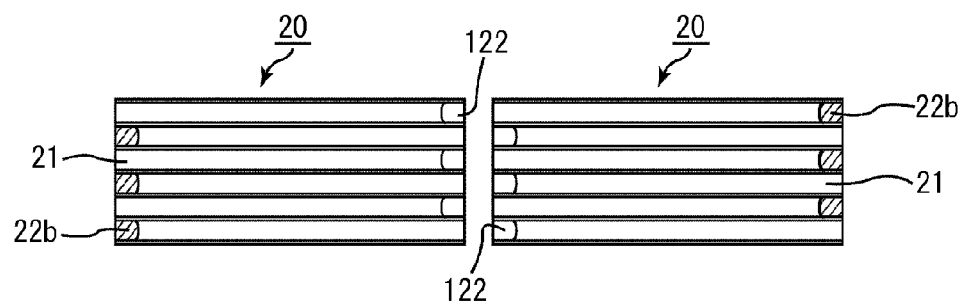

(1) First, by following the same procedure as in the processes (1) to (6) of the method for manufacturing a honeycomb structure of the fourth embodiment of the present invention, honeycomb fired bodies 20 having almost the same longitudinal length as a designed value of the longitudinal length a honeycomb structure to be manufactured are manufactured (see FIGS. 10A and 10B). In the manufactured honeycomb fired bodies 20, plug portions 22b are formed through the firing treatment once on one end face side, and a plug material paste 122 is injected on the other end face side.

Figure 10C:
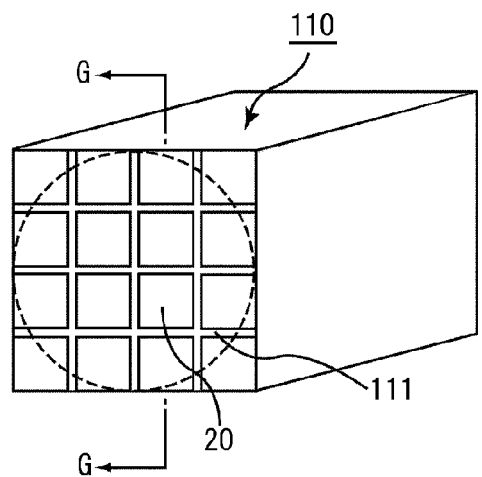
Figure 10D:
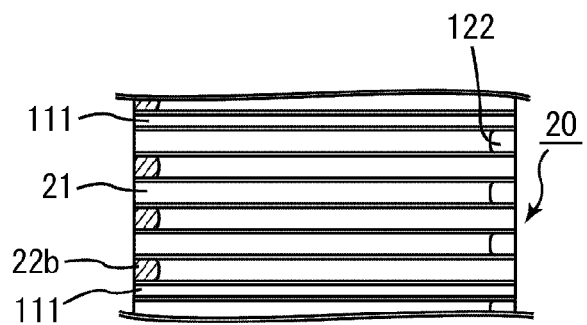
Figure 11A:
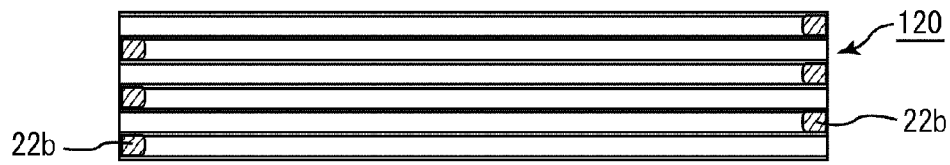
FIGS. 11A to 11G are explanatory views each illustrating manufacturing processes of the sixth embodiment of the present invention.
Figure 11B:
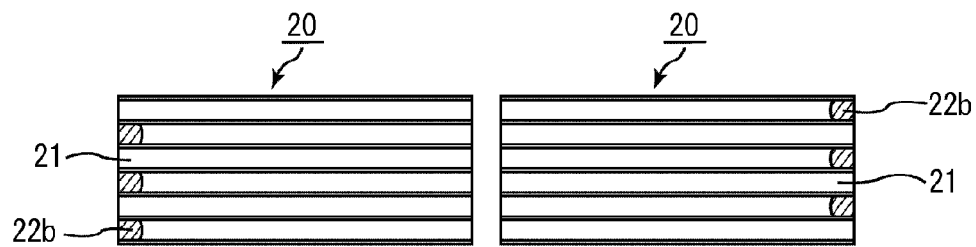
Figure 11C:
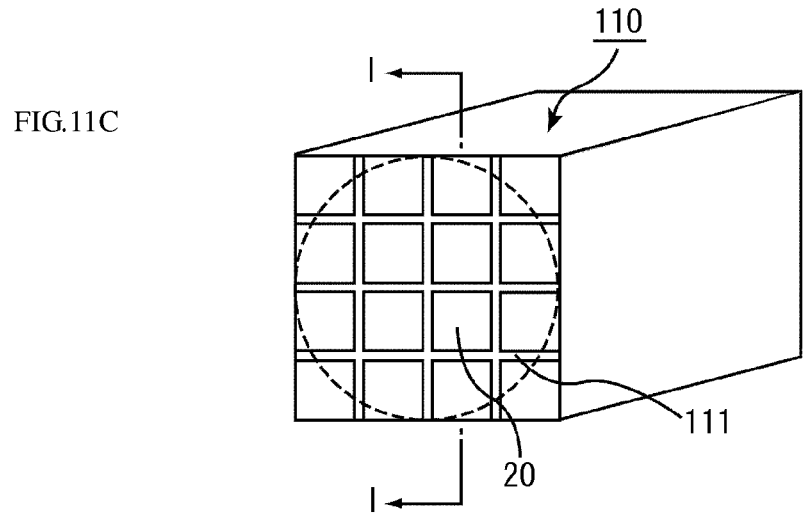
Figure 11D:
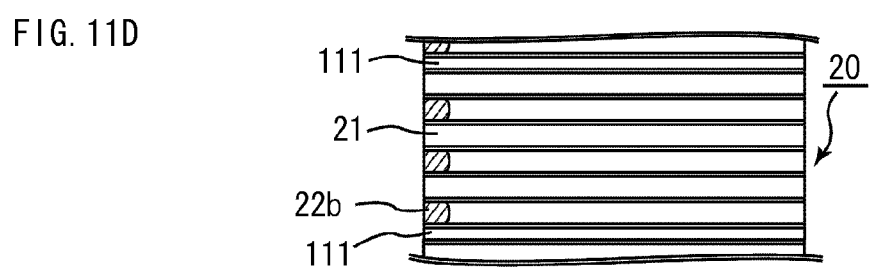

(2) Next, an adhesive paste for forming an adhesive layer is applied to side faces of the honeycomb fired bodies 20 manufactured in the process (1) to form an adhesive paste layer 111. Repeatedly another honeycomb fired body 20 is laminated on the adhesive paste layer 111 to manufacture an aggregated body 110 of the honeycomb fired bodies in which a predetermined number of the honeycomb fired bodies are combined with one another (FIGS. 10C and 10D). FIG. 11D is a partially enlarged G-G line cross-sectional view of FIG. 10C.

Here, as the adhesive paste, a paste having the same composition as that of the wet mixture used for manufacturing a honeycomb molded body is used.

(3) Next, the aggregated body 110 of honeycomb fired bodies manufactured in the process (2) is fired.

Here, the firing treatment is carried out by following the same procedure as in the process (4) of the fourth embodiment of the present invention.

Figure 10F:
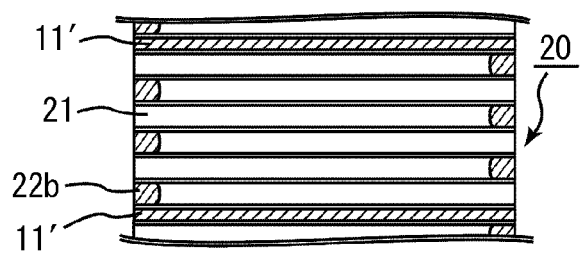
Figure 10E:
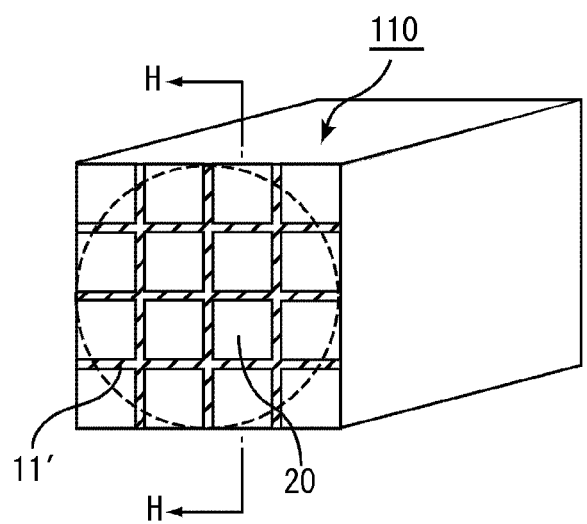

By carrying out the process, plug portions 22b and an adhesive layers 11' are formed through the firing treatment (see FIGS. 10E and 10F). FIG. 10F is a partially enlarged H—H line cross-sectional view of FIG. 10E.

Figure 10G:
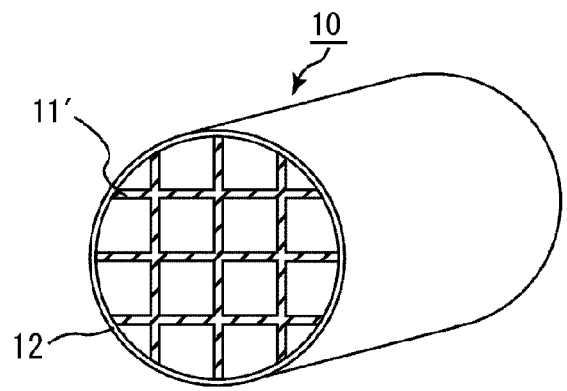

(4) Thereafter, by following the same procedure as in the process (9) of the fourth embodiment of the present invention, a honeycomb structure 10 is manufactured (see FIG. 10G).

In the present embodiment, a honeycomb structure can be manufactured through the processes as described above.

Here, the configuration of the honeycomb structure manufactured by the manufacturing method of the present embodiment of the present invention is the same as the configuration of the honeycomb structure of the fourth embodiment, except that the adhesive layer is formed through the firing treatment.

The honeycomb structure according to the fifth embodiment of the present invention can exert the same effects as those of the fourth embodiment of the present invention.

Moreover, in the present embodiment, since the adhesive layer is formed through the firing treatment, the honeycomb fired bodies are bonded to one another with an increased strength. Therefore, when a regenerating process is carried out on a honeycomb structure having been used for capturing PM, cracks due to heat are less likely to occur. Moreover, it may be easier to prevent displacement and coming off of the honeycomb fired bodies which are caused by an exhaust-gas pressure in use.

Examples

Hereinafter, an example that discloses the fifth embodiment of the present invention more specifically is shown, but the present invention is not limited to the example.

Example 5

(1) First, honeycomb fired bodies having a size of 34.3 mm×34.3 mm×150 mm in which predetermined cells are sealed only at either one end thereof are manufactured by following the same procedure as in the processes (1) to (4) of Example 4.

(2) In the honeycomb fired bodies obtained in the process (1), a plug material paste is injected to end portions of unsealed cells to seal each cell at either one end thereof.

Here, a paste having the same composition as that of the wet mixture used for manufacturing a honeycomb molded body by extrusion-molding is used as the plug material paste.

(3) Next, an adhesive paste is applied to side faces of the honeycomb fired bodies manufactured through the processes (1) and (2), and 16 pieces of the honeycomb fired bodies are bonded to one another with the adhesive paste interposed therebetween. Thus, an aggregated body of the honeycomb fired bodies is manufactured.

Here, a paste having the same composition as that of the plug material paste used in the process (2) is used as the adhesive paste.

(4) Next, under the same conditions as those of the process (3) of Example 4, the honeycomb fired bodies are fired again.

In the process, the plug material paste injected in the process (2) and the adhesive paste applied in the process (3) are respectively formed into plug portions and an adhesive layer through the firing treatment.

(5) Thereafter, the periphery of the aggregated body of honeycomb fired bodies is cut to manufacture a round pillar-shaped honeycomb block with the adhesive layer having a thickness of 1 mm. Moreover, a coat layer is formed by following the same procedure as in the process (8) of Example 4. Thus, a honeycomb structure is manufactured.

The honeycomb structure manufactured in Example 5 shows the similar degree of the pressure loss and the regeneration limit value to those of the honeycomb structure manufactured in Comparative Example 1.

Sixth Embodiment

In the present embodiment, the sequence of the processes in the method for manufacturing a honeycomb structure is different from the sequence of the processes in the method for manufacturing a honeycomb structure of the fourth embodiment of the present invention.

FIGS. 11A to 11G are explanatory views each illustrating manufacturing processes of the sixth embodiment of the present invention.

(1) In the method for manufacturing a honeycomb structure of the present embodiment, first, honeycomb fired bodies 20 having the same longitudinal length as a designed value of a longitudinal length of a honeycomb structure to be manufactured are manufactured by following the same procedure as in the processes (1) to (5) of the method for manufacturing a honeycomb structure of the fourth embodiment of the present invention. In the manufactured honeycomb structure, plug portions 22b are formed through the firing treatment in predetermined cells on one end face side. (see FIGS. 11A and 11B).

(2) Next, an adhesive paste for forming an adhesive layer is applied to side faces of the honeycomb fired bodies 20 with predetermined cells being sealed on one end face side to form an adhesive paste layer 111. Repeatedly another honeycomb fired body 20 is laminated on the adhesive paste layer 111 to manufacture an aggregated body 110 of the honeycomb fired bodies in which a predetermined number of the honeycomb fired bodies 20 are combined with one another (FIGS. 11C and 11D). FIG. 11D is a partially enlarged I-I line cross-sectional view of FIG. 11C.

Here, as the adhesive paste, a paste-form composition having the same composition as that of the wet mixture used for manufacturing a honeycomb molded body is used.

(3) In the aggregated body 110 of the honeycomb fired bodies, a plug material paste is injected to end portions of unsealed cells out of cells needed to be sealed so that each cell is sealed at either one end thereof.

Here, as the plug material paste, a paste-form composition having the same composition as that of the wet mixture used for manufacturing a honeycomb molded body is used.

(4) Next, the aggregated body 110 through the process (3) is fired again.

The firing treatment is carried out by following the same procedure as in the process (4) of the fourth embodiment of the present invention.

Figure 11E:
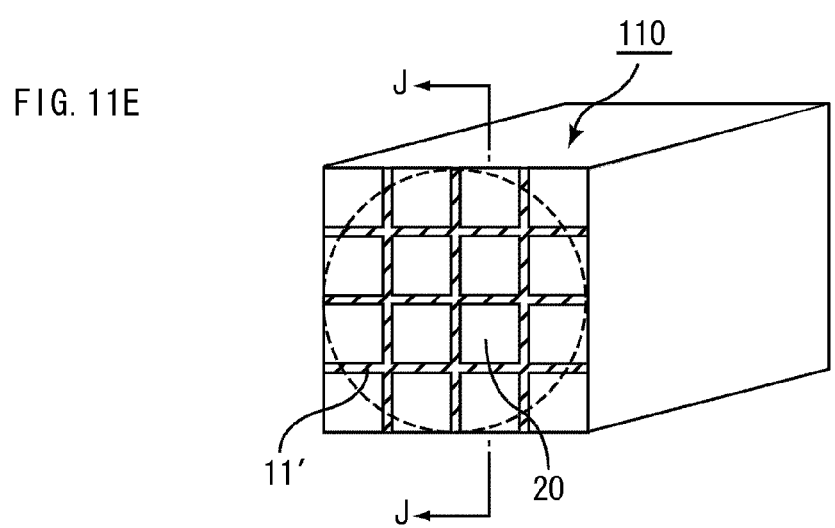
Figure 11F:
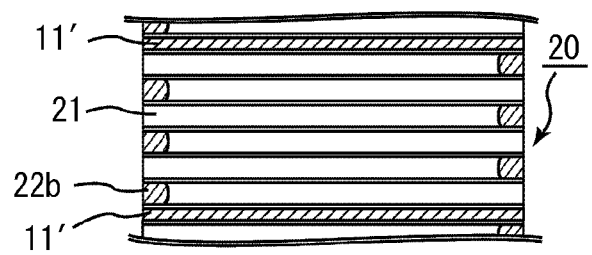

By carrying out the process, an aggregated body 110 of the honeycomb fired bodies in which plug portions 22b formed by the fired plug material paste are formed in predetermined end portions of the respective cells 21 can be manufactured (see FIGS. 11E and 11F). FIG. 11F is a partially enlarged J-J line cross-sectional view of FIG. 11E.

Moreover, in the aggregated body 110 of the honeycomb fired bodies through the process, an adhesive layer 11' is also formed through the firing treatment.

Figure 11G:
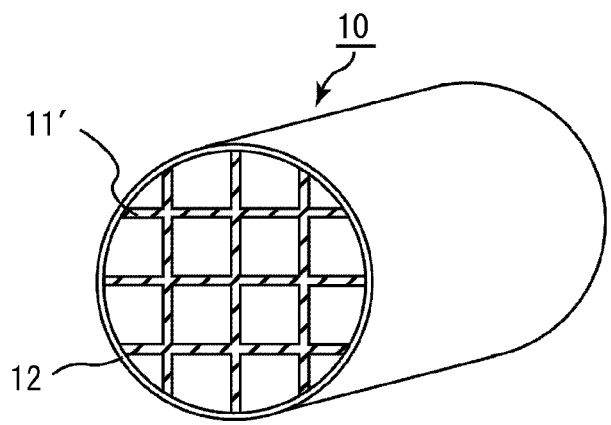

(5) Thereafter, by following the same procedure as in the process (9) of the fourth embodiment of the present invention, a honeycomb structure 10 is manufactured (see FIG. 11G).

In the present embodiment, a honeycomb structure can be manufactured through the processes as described above.

Here, the configuration of the honeycomb structure manufactured by the manufacturing method of the present embodiment is the same as the configuration of the honeycomb structure manufactured in the fifth embodiment of the present invention.

The honeycomb structure according to the sixth embodiment of the present invention can exert the same effects as those of the fifth embodiment of the present invention.

Examples

Hereinafter, an example that discloses the sixth embodiment of the present invention more specifically is shown, but the present invention is not limited to the example.

Example 6

(1) First, honeycomb fired bodies having a size of 34.3 mm×34.3 mm×150 mm in which predetermined cells are sealed only at either one end thereof are manufactured by following the same procedure as in the processes (1) to (4) of Example 4.

(2) Next, an adhesive paste is applied to side faces of the honeycomb fired bodies manufactured through the process (1), and 16 pieces of the honeycomb fired bodies are bonded to one another with the adhesive paste interposed therebetween. Thus, an aggregated body of the honeycomb fired bodies is manufactured.

Here, a paste having the same composition as that of the wet mixture used for manufacturing a honeycomb molded body by extrusion-molding is used as the adhesive paste.

(3) In the aggregated body of the honeycomb fired bodies obtained in the process (2), a plug material paste is injected to end portions of unsealed cells to seal each cell at either one end thereof.

Here, a paste having the same composition as that of the wet mixture used for manufacturing a honeycomb molded body by extrusion-molding is used as the plug material paste.

(4) Next, under the same conditions as those of the process (3) of Example 4, the honeycomb fired bodies are fired again.

In the process, the adhesive paste applied in the process (2) and the plug material paste injected in the process (3) are fired to form an adhesive layer and plug portions, respectively.

(5) Thereafter, the periphery of the aggregated body of honeycomb fired bodies is cut to manufacture a round pillar-shaped honeycomb block with the adhesive layer having a thickness of 1 mm. Moreover, a coat layer is formed by following the same procedure as in the process (8) of Example 4. Thus, a honeycomb structure is manufactured.

The honeycomb structure to be manufactured in Example 6 shows the similar degree of the pressure loss and the regeneration limit value to those of the honeycomb structure to be manufactured in Comparative Example 1.

The timing when the firing treatment is carried out again or the timing for injecting the plug material paste is different among the above-described fourth to sixth embodiments of the present invention.

Figure 12:
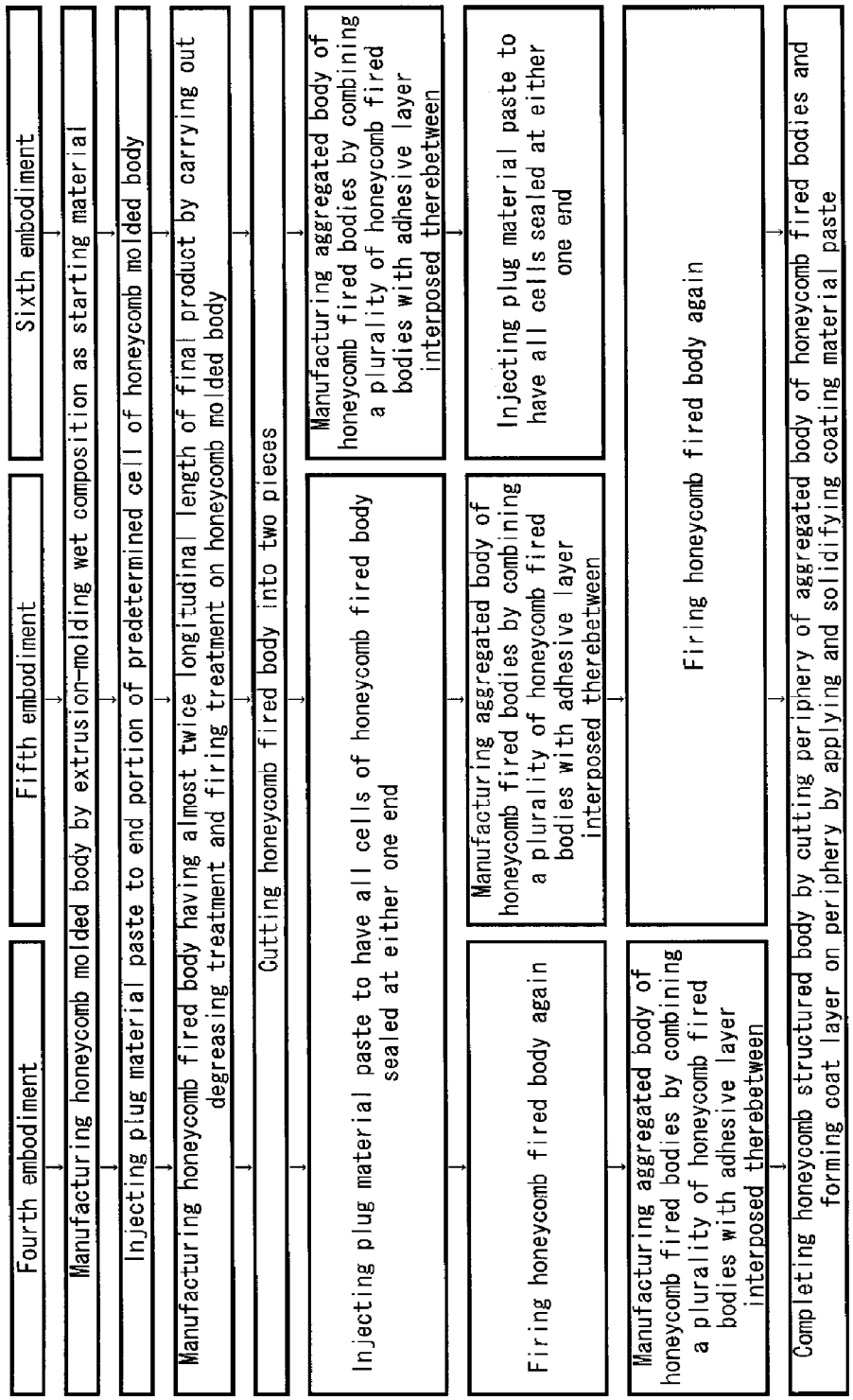
FIG. 12 is a flow chart of the methods for manufacturing a honeycomb structure according to the fourth to sixth embodiments of the present invention.

Further, the processes of the methods for manufacturing a honeycomb structure according to the respective embodiments of the present invention are shown in FIG. 12.

FIG. 12 is a flow chart of the methods for manufacturing a honeycomb structure according to the fourth to sixth embodiments of the present invention.

As shown in FIG. 12, the firing treatment for the second time is carried out at a different timing between the methods for manufacturing a honeycomb structure according to the fourth and fifth embodiments of the present invention. As a result, objects to be fired are different from each other. Moreover, the plurality of honeycomb fired bodies are combined with one another at a different timing between the methods for manufacturing a honeycomb structure of the fifth and sixth embodiments of the present invention.

Seventh Embodiment

The present embodiment differs from the method for manufacturing a honeycomb structure of the first embodiment of the present invention in that the plug material paste injected into predetermined end portions of cells is fired to form plug portions.

(1) In the method for manufacturing a honeycomb structure of the present embodiment, first, honeycomb fired bodies with no plug portion formed in any cells are manufactured by following the same procedure as in the processes (1) to (4) of the method for manufacturing a honeycomb structure of the first embodiment of the present invention.

(2) Next, a plug material paste is injected to end portions of cells of the honeycomb fired bodies to seal each cell at either one end thereof. Subsequently, the firing treatment is carried out under the same conditions as those of the process (3) of the first embodiment of the present invention, and the plug material paste is fired to form plug portions.

Here, as the plug material paste, a paste-form composition having almost the same composition as that of the wet mixture used for manufacturing a honeycomb molded body is used.

(3) Next, by following the same procedure as in the processes (6) and (7) of the first embodiment of the present invention, a honeycomb structure is manufactured.

Here, as the adhesive paste and the coating material paste, for example, a paste containing an inorganic binder, an organic binder and inorganic particles is used. The adhesive paste and the coating material paste may further contain at least one of inorganic fibers and whiskers.

In the present embodiment, a honeycomb structure in which the plug portions on both ends of are formed through the firing treatment can be manufactured through the processes as described above.

Here, the configuration of the honeycomb structure manufactured in the present embodiment is the same as the configuration of the honeycomb structure manufactured in the first embodiment of the present invention, except that the plug portions are formed through the firing treatment.

The honeycomb structure according to the seventh embodiment of the present invention can exert the same effects as the effects (1) and (3) of the first embodiment of the present invention.

Eighth Embodiment

The present embodiment differs from the method for manufacturing a honeycomb structure of the seventh embodiment of the present invention in that an adhesive paste is fired to form an adhesive layer, and in that a coating material paste is fired to form a coat layer.

(1) In the method for manufacturing a honeycomb structure of the present embodiment, first, honeycomb fired bodies with no plug portion formed in any cells are manufactured by following the same procedure as in the processes (1) to (4) of the method for manufacturing a honeycomb structure of the first embodiment of the present invention.

(2) Next, a plug material paste is injected to end portions of cells of the honeycomb fired bodies to seal each cell at either one end thereof.

(3) Next, an adhesive paste for forming an adhesive layer is applied to side faces of the honeycomb fired bodies to form an adhesive paste layer. Repeatedly another honeycomb fired body is laminated on the adhesive paste layer to manufacture an aggregated body of the honeycomb fired bodies in which a predetermined number of the honeycomb fired bodies are combined with one another.

Here, a paste having almost the same composition as that of the wet mixture used for manufacturing a honeycomb molded body is used as the adhesive paste.

(4) Next, under the same conditions as those of the process (3) of the first embodiment of the present invention, the aggregated body of the honeycomb fired bodies manufactured in the process (3) is fired.

Through the process, the plug material paste injected in the process (2) and the adhesive paste layer formed in the process (3) are fired and formed into plug portions and an adhesive layer, respectively.

(5) Thereafter, the aggregated body of the honeycomb fired bodies is cut by using a diamond cutter and the like to form a honeycomb block. A coating material paste is applied to the periphery of the honeycomb block. The coating material paste is fired by heating to form a coat layer. Thus, a honeycomb structure is manufactured.

Here, a paste having almost the same composition as that of the wet mixture used for manufacturing a honeycomb molded body is used as the coating material paste.

In the present embodiment, a honeycomb structure in which the plug portions on both ends, the adhesive layer and the coat layer are formed through the firing treatment can be manufactured through the processes as described above.

The honeycomb structure according to the eighth embodiment of the present invention can exert the same effects as those of the fourth embodiment of the present invention.

As described above, the methods for manufacturing a honeycomb structure according to the first to eighth embodiments of the present invention are used for manufacturing a honeycomb structure in which predetermined cells are sealed. Therefore, a honeycomb structure that is manufactured through a method for manufacturing the honeycomb structure according to the first to eighth embodiments of the present invention is preferably used as a filter.

Although the main component of the constituent materials of the honeycomb fired body that forms the honeycomb structure manufactured in each of the first to eighth embodiments of the present invention is silicon carbide, the honeycomb fired bodies of the honeycomb structure manufactured in the embodiments of the present invention may contain, for example, nitride ceramics such as aluminum nitride, silicon nitride, boron nitride, and titanium nitride; carbide ceramics such as zirconium carbide, titanium carbide, tantalum carbide, and tungsten carbide; oxide ceramics such as alumina, zirconia, cordierite, mullite, and aluminum titanate; and the like, as the main component of the constituent materials.

Among these components, non-oxide ceramics are preferable, and silicon carbide is more preferable because this is excellent in thermal resistance properties, mechanical strength, thermal conductivity and the like.

Moreover, silicon-containing ceramics, in which metallic silicon is blended with the above described ceramics, as well as a ceramic material such as ceramic bound by silicon or silicate compounds, may be used. And among these, those ceramics (silicon-containing silicon carbide) in which metallic silicon is blended with silicon carbide are preferably used. Especially, silicon-containing silicon carbide ceramics containing about 60% by weight or more of silicon carbide are preferable.

Ninth Embodiment

The methods for manufacturing a honeycomb structure according to the first to eighth embodiments of the present invention are used for manufacturing a honeycomb structure in which predetermined cells are sealed; however, the method for manufacturing a honeycomb structure of the present embodiment relates to a method for manufacturing a honeycomb structure in which cells are not sealed.

FIGS. 13A to 13D are explanatory views each illustrating manufacturing processes of the ninth embodiment of the present invention.

(1) In the method for manufacturing a honeycomb structure of the present embodiment, first, by following the same procedure as in the processes (1) and (2) of the method for manufacturing a honeycomb structure of the first embodiment of the present invention, dried honeycomb molded bodies are manufactured, except that a ceramic raw material described below is used as the ceramic raw material.

In the present embodiment, a wet mixture containing silica-alumina fibers, alumina particles and an inorganic binder is used as the ceramic raw material.

Figure 13A:
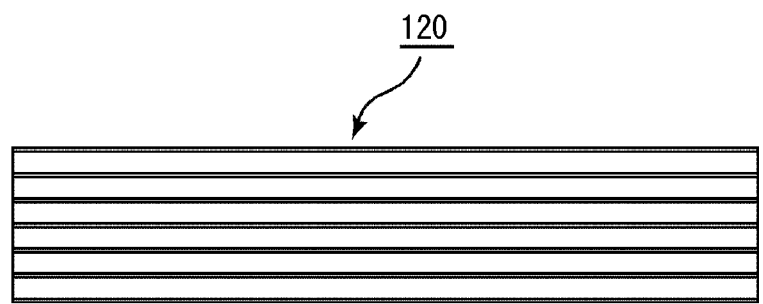
FIGS. 13A to 13D are explanatory views each illustrating manufacturing processes of the ninth embodiment of the present invention.

(2) Next, by following the same procedure as in the process (3) of the method for manufacturing a honeycomb structure of the first embodiment of the present invention, the honeycomb molded bodies are degreased and fired to manufacture honeycomb fired bodies 120 (see FIG. 13A).

Here, the degreasing treatment is preferably carried out at a temperature of about 400° C. and about 2 hours. The firing temperature is preferably at least about 600° C. and at most about 1200° C., more preferably, in the range of about 600° C. to about 1000° C.

Figure 13B:
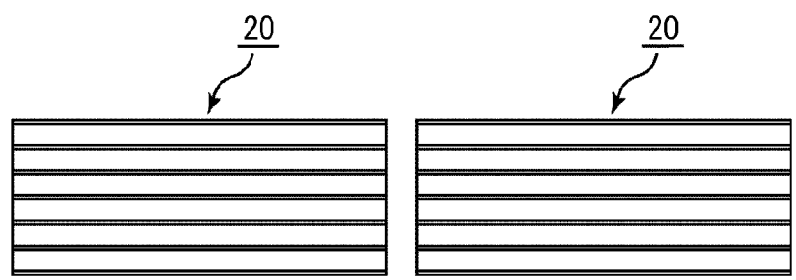
Figure 13C:
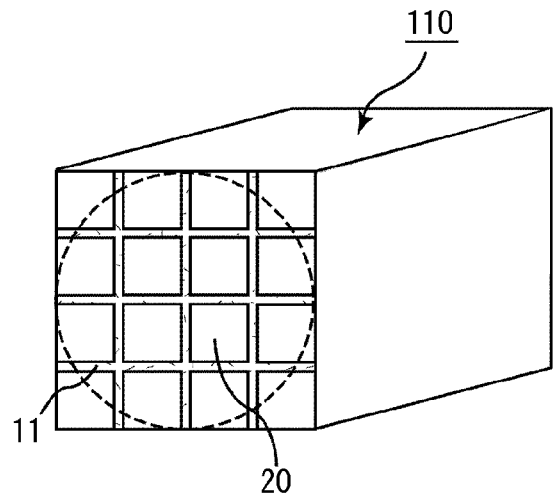
Figure 13D:
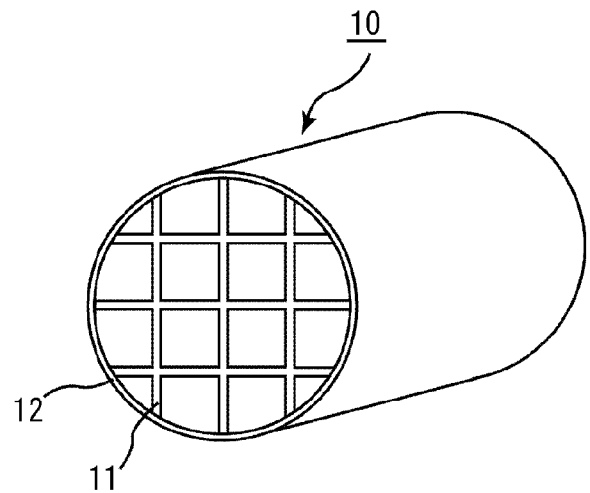

(3) Next, by following the same procedure as in the processes (4), (6) and (7) of the method for manufacturing a honeycomb structure of the first embodiment of the present invention, a honeycomb structure 10 with the cells unsealed is manufactured (see FIGS. 13B to 13D).

Here, as the adhesive paste and the coating material paste, pastes having almost the same composition are used.

For example, a paste of a mixture containing an inorganic binder, ceramic particles and at least one of inorganic fibers and whiskers, or the like is used as the adhesive paste and the coating material paste.

The honeycomb structure manufactured in such a manufacturing method can be suitably used as a catalyst carrier.

The honeycomb structure according to the ninth embodiment of the present invention can exert the same effect as the effect (1) of the first embodiment of the present invention.

Moreover, in the present embodiment, since the adhesive layer and the coat layer are formed by using almost the same materials, an inner stress caused by a difference between the thermal expansion coefficients of the component members is less likely to occur in the manufactured honeycomb structure. Therefore, it is possible to further improve the reliability.

Examples

Hereinafter, an example that discloses the ninth embodiment of the present invention more specifically is shown, but the present invention is not limited to this example.

Example 7

(1) An amount of 40% by weight of γ-alumina particles having an average particle diameter of 2 μm, 10% by weight of silica-alumina fibers (average fiber diameter: 10 μm; average fiber length: 100 μm; aspect ratio: 10) and 50% by weight silica sol (solid concentration: 30% by weight) are mixed. To 100 parts by weight of the resulting mixture are added 6 parts by weight of methylcellulose (organic binder) and slight amounts of a plasticizer and a lubricant, and the mixture is further mixed and kneaded to obtain a wet mixture. The wet mixture is then extrusion-molded through extrusion-molding treatment to manufacture raw honeycomb molded bodies having a shape almost the same as that shown in FIG. 3A, with the cells unsealed.

(2) Subsequently, the raw honeycomb molded bodies are dried by using a microwave drying apparatus and a hot-air drying apparatus to obtain dried honeycomb molded bodies. Next, the dried honeycomb molded bodies are placed on a firing jig, and then degreased at a temperature of 400° C. Thereafter, firing treatment is carried out at a temperature of 800° C. for 2 hours to manufacture honeycomb fired bodies having a porosity of 45%, an average pore diameter of 15 µm, a size of 34.3 mm×34.3 mm×300.5 mm, the number of cells (cell density) of 93 pcs/cm$^2$ (600 cpsi) and a thickness of a cell wall of 0.2 mm.

(3) Next, each of the honeycomb fired bodies are cut into two equal pieces by using an OD diamond blade having a board thickness of 0.5 mm to obtain honeycomb fired bodies having a size of 34.3 mm×34.3 mm×150 mm.

(4) Next, an adhesive paste is applied to side faces of the honeycomb fired bodies manufactured through the processes (1) to (3), and 16 pieces of the honeycomb fired bodies are bonded to one another with the adhesive paste interposed therebetween so that a rectangular pillar-shaped aggregated body of the honeycomb fired bodies is manufactured. Subsequently, the periphery of the aggregated body of the honeycomb fired bodies is cut by using a diamond cutter to manufacture a round pillar-shaped honeycomb block.

Here, a paste prepared by mixing 29% by weight of γ-alumina (average particle diameter of 2 µm), 7% by weight of silica-alumina fibers (average fiber diameter: 10 µm; average fiber length: 100 µm), 34% by weight of silica sol (solid concentration: 30% by weight), 5% by weight of carboxymethyl cellulose and 25% by weight of water is used as the adhesive paste.

(5) Next, a coating material paste is applied to the periphery of the honeycomb block to form a coating material paste layer. Here, the same paste as the adhesive paste used in the process (4) is used as the coating material paste.

Next, the adhesive paste and the coating material paste are dried at 120° C., and further solidified at a temperature of 700° C. for 2 hours to manufacture a round pillar-shaped honeycomb structure having a size of 143.8 mm in diameter× 150 mm in length with an adhesive layer having a thickness of 1 mm and a coat layer formed on the periphery thereof.

Tenth Embodiment

In the present embodiment, the sequence of the processes in the method for manufacturing a honeycomb structure is different from the sequence of the processes in the method for manufacturing a honeycomb structure of the ninth embodiment of the present invention.

FIGS. 14A to 14E are explanatory views each illustrating manufacturing processes of the tenth embodiment of the present invention.

Figure 14A:
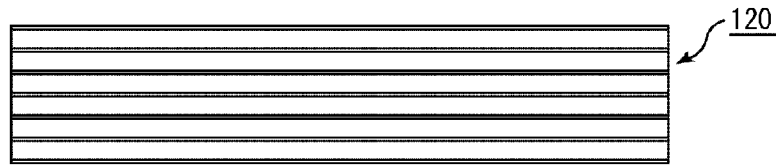
FIGS. 14A to 14E are explanatory views each illustrating manufacturing processes of the tenth embodiment of the present invention.

(1) In the method for manufacturing a honeycomb structure of the present embodiment of the present invention, first, honeycomb fired bodies 120 are manufactured by following the same method as in the processes (1) and (2) of the method for manufacturing a honeycomb structure of the ninth embodiment of the present invention (see FIG. 14A).

Figure 14B:
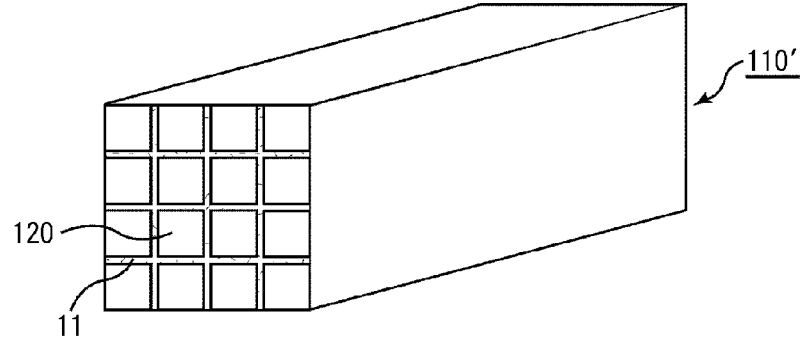

(2) Next, by following the same procedure as in the process (2) of the method for manufacturing a honeycomb structure of the second embodiment of the present invention, an aggregated body 110' of honeycomb fired bodies in which a predetermined number of honeycomb fired bodies are combined with one another is manufactured (see FIG. 14B).

Figure 14C:
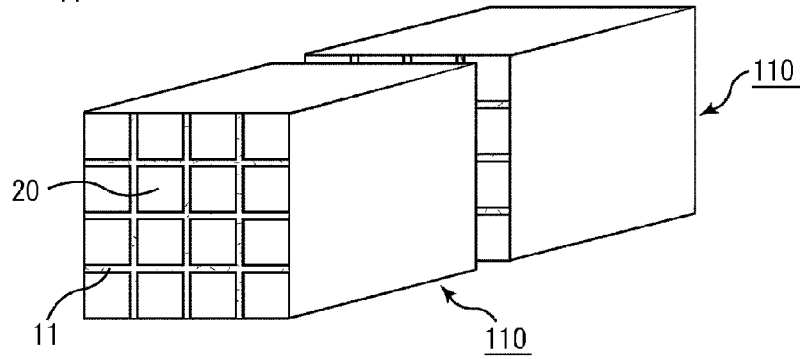

(3) Next, by following the same procedure as in the process (3) of the method for manufacturing a honeycomb structure of the second embodiment of the present invention, the aggregated body 110' of honeycomb fired bodies is cut to manufacture an aggregated body 110 of honeycomb fired bodies (see FIG. 14C).

Figure 14D:
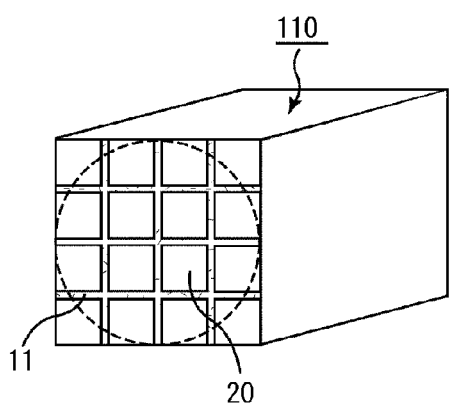
Figure 14E:
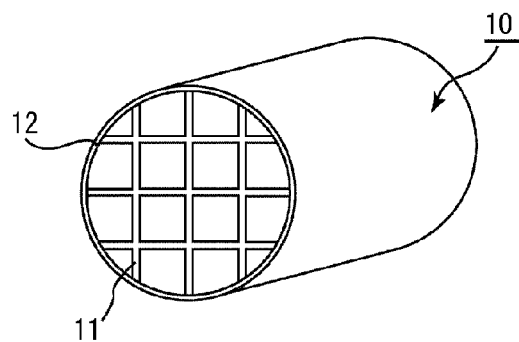

(4) Next, by following the same procedure as in the process (5) of the method for manufacturing a honeycomb structure of the second embodiment of the present invention, cutting treatment along a broken line in FIG. 14D and formation of a coat layer are carried out. Thus, a honeycomb structure 10 with the cells unsealed is manufactured (see FIG. 14E).

A honeycomb structure manufactured in such a manufacturing method can be suitably used as a catalyst carrier.

The honeycomb structure according to the tenth embodiment of the present invention can exert the same effects as those of the ninth embodiment.

Examples

Hereinafter, an example that discloses the tenth embodiment of the present invention more specifically is shown, but the present invention is not limited to the example.

Example 8

(1) Honeycomb fired bodies having a porosity of 45%, an average pore diameter of 15 µm, a size of 34.3 mm×34.3 mm×300.5 mm, the number of cells (cell density) of 93 pcs/cm$^2$ (600 cpsi) and a thickness of a cell wall of 0.2 mm are manufactured by following the same procedure as in the processes (1) and (2) of Example 7. In the manufactured honeycomb structure, the cells are unsealed.

(2) Next, an adhesive paste is applied to side faces of the honeycomb fired bodies manufactured through the process (1), and 16 pieces of the honeycomb fired bodies are bonded to one another with the adhesive paste interposed therebetween. Thus, a rectangular pillar-shaped aggregated body of the honeycomb fired bodies is manufactured.

Here, the same adhesive paste as that used in the process (4) of Example 7 is used as the adhesive paste.

(3) Subsequently, the aggregated body of the honeycomb fired bodies is cut into two equal pieces by using an OD diamond blade having a board thickness of 0.5 mm.

Subsequently, the periphery of the aggregated body of the honeycomb fired bodies is cut to manufacture a round pillar-shaped honeycomb block.

(4) Next, a coating material paste is applied to the periphery of the honeycomb block to form a coating material paste layer. Here, the same paste as the adhesive paste used in the process (2) is used as the coating material paste.

Next, the adhesive paste and the coating material paste are dried at 120° C., and further solidified at a temperature of 700° C. for 2 hours to manufacture a round pillar-shaped honeycomb structure having a size of 143.8 mm in diameter× 150 mm in length with an adhesive layer having a thickness of 1 mm and a coat layer formed on the periphery thereof.

Although the processes for manufacturing a honeycomb structure according to the ninth and tenth embodiments of the present invention described above are different, the honeycomb structure manufactured in the respective embodiments have the same configurations.

Figure 15:
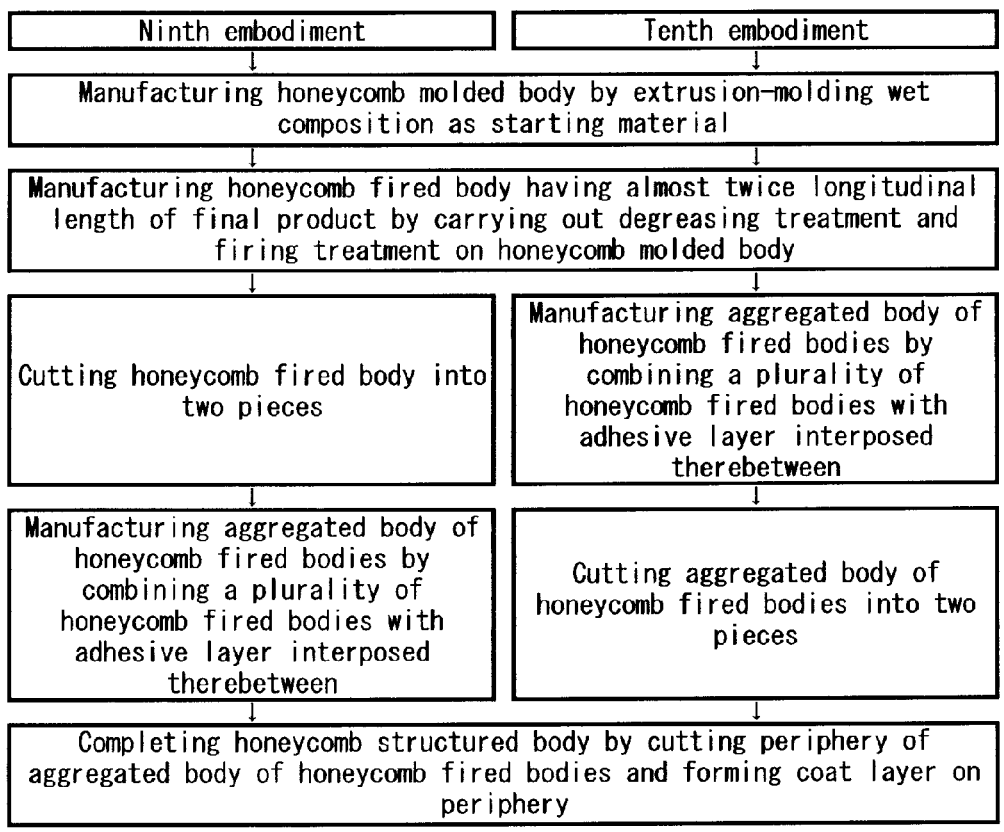
FIG. 15 is a flow chart of the methods for manufacturing a honeycomb structure according to the ninth and tenth embodiments of the present invention.

The processes of the methods for manufacturing a honeycomb structure according to the respective embodiments of the present invention are shown in FIG. 15.

FIG. 15 is a flow chart of the methods for manufacturing a honeycomb structure according to the ninth and tenth embodiments of the present invention.

As shown in FIG. 15, the timing for cutting the honeycomb fired bodies and the timing for combining the plurality of honeycomb fired bodies are different between the methods for manufacturing a honeycomb structure according to the ninth and tenth embodiments of the present invention.

As described above, the methods for manufacturing a honeycomb structure according to the ninth and tenth embodiments of the present invention are used for manufacturing a honeycomb structure with the cells unsealed. Therefore, such a honeycomb structure is preferably used as a catalyst carrier.

Moreover, in the methods for manufacturing a honeycomb structure according to the ninth and tenth embodiments of the present invention, a wet mixture containing inorganic fibers (silica-alumina fibers), inorganic particles (alumina particles) and an inorganic binder is desirably used as the ceramic raw material.

Examples of the inorganic fibers other than silica-alumina fibers include alumina fibers, silica fibers, silicon carbide fibers, glass fibers, potassium titanate fibers, and the like. Each of these may be used alone, or two or more kinds of these may be used in combination.

Examples of the inorganic particles other than alumina particles include silicon carbide particles, silicon nitride particles, silica particles, zirconia particles, titania particles, ceria particles, mullite particles, and the like. Each of these may be used alone, or two or more kinds of these may be used in combination.

Although the inorganic binder is not particularly limited, examples thereof include inorganic sol, clay-based binder and the like. As the inorganic sols, alumina sol, silica sol, titania sol or water glass is desirably used. As the clay-based binder, white clay, kaolin, montmorillonite, or polychain structure clays (sepiolite, attapulgite, or the like) is desirably used. Each of these may be used alone, or two or more kinds of these may be used in combination. Here, the inorganic binder is not always needed to be contained.

Moreover, an organic binder, a dispersant, a molding auxiliary and the like may be added to the ceramic raw material, if necessary.

Such a ceramic raw material has a high specific surface area, and is suitably used for manufacturing a honeycomb structure to be used as a catalyst carrier (honeycomb catalyst).

In the ninth and tenth embodiments of the present invention, a ceramic raw material containing inorganic fibers, inorganic particles and an inorganic binder is used as the ceramic raw material for manufacturing a honeycomb structure for use as a catalyst carrier; however, a raw material for manufacturing a fired body including cordierite or aluminum titanate may be used as the ceramic raw material used for manufacturing a honeycomb structure to be used as a catalyst carrier.

When any of these ceramic raw materials is used, degreasing conditions and firing conditions are altered appropriately depending on the ceramic raw material to be used.

Moreover, when any of these ceramic raw materials is used, the honeycomb structure may be formed by a single honeycomb fired body, or may be formed by a plurality of honeycomb fired bodies; however, the honeycomb structure is desirably formed by a plurality of honeycomb fired bodies.

Other Embodiments

In the honeycomb structure according to the first to tenth embodiments of the present invention, all of the cells have almost the same rectangular cross-section perpendicular to the longitudinal direction of the honeycomb fired bodies. However, in the honeycomb structure of the embodiment of the present invention, the cross-sectional shapes of the respective cells perpendicular to the longitudinal direction of the honeycomb fired body may be, for example, an almost octagonal shape and an almost rectangular shape, or the like.

Figure 16A:
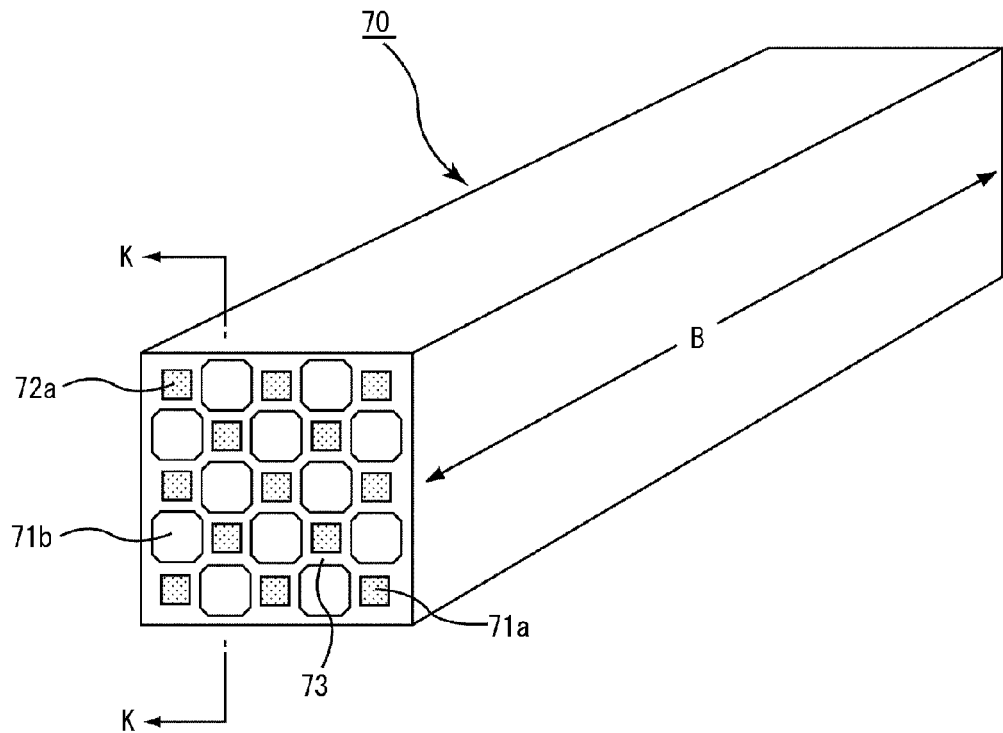
FIG. 16A is a perspective view schematically illustrating one example of a honeycomb fired body constituting the honeycomb structure according to one embodiment of the present invention.
Figure 16B:
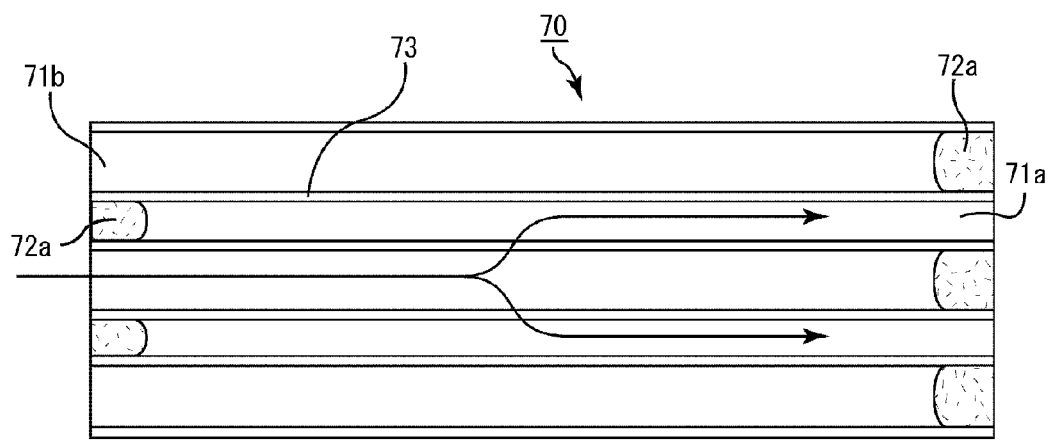
FIG. 16B is a K-K line cross-sectional view thereof.

A honeycomb fired body 70 that forms the honeycomb structure of the embodiments of the present invention, shown in FIGS. 16A and 16B, has a configuration in which a large number of cells 71a and 71b are placed in parallel with one another in the longitudinal direction (direction of arrow B in FIG. 16A) with a cell wall 73 interposed therebetween. The respective cells 71a and 71b are sealed with a plug portion 72a at either one end thereof.

Here, the cross-sectional shape perpendicular to the longitudinal direction of the cell 71a is a rectangular shape, and the cross-sectional shape perpendicular to the longitudinal direction of the cell 71b is an octagonal shape.

In this case, the honeycomb structure may have cells each sealed at a predetermined end, like in the first to eighth embodiments of the present invention, or may have unsealed cells, like in the ninth and tenth embodiments of the present invention.

In the methods for manufacturing a honeycomb structure of the first to tenth embodiments of the present invention, a plurality of rectangular pillar-shaped honeycomb fired bodies are combined to form an aggregated body of the honeycomb fired bodies, and then the aggregated body is cut to manufacture a honeycomb block. However, in the method for manufacturing a honeycomb structure of the embodiment of the present invention, the honeycomb block may be manufactured by combining honeycomb fired bodies which have been formed to have a predetermined shape.

Figure 17A:
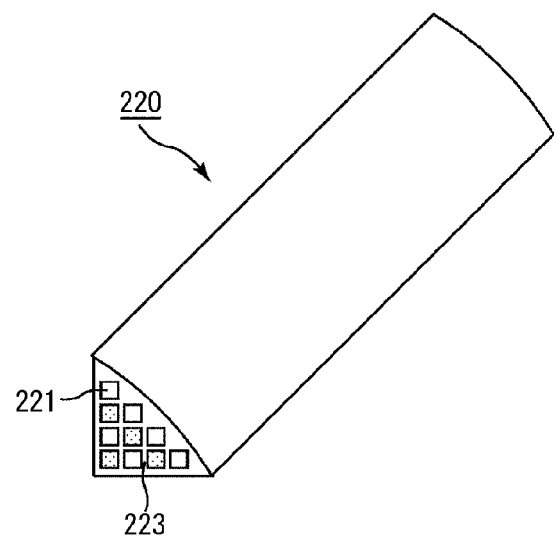
FIGS. 17A to 17C are perspective views each illustrating another example of a honeycomb fired body manufactured in the method for manufacturing a honeycomb structure according to embodiments of the present invention.
Figure 17B:
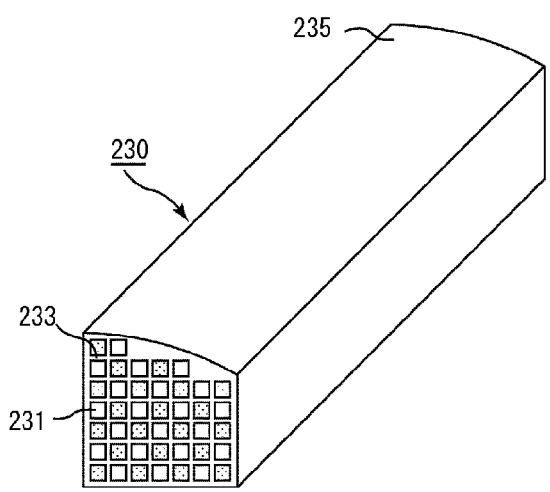
Figure 17C:
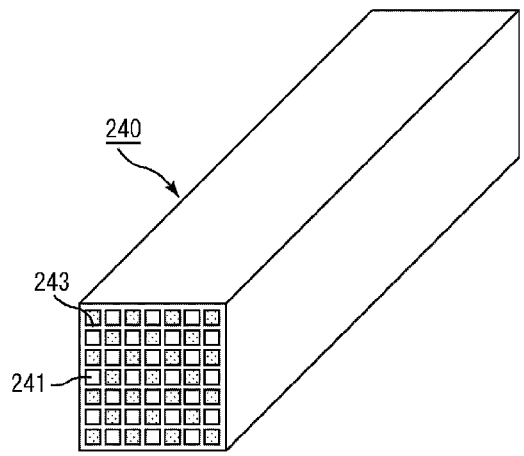

FIGS. 17A to 17C are perspective views each illustrating another example of a honeycomb fired body manufactured in the method for manufacturing a honeycomb structure of the embodiments of the present invention.

Namely, a honeycomb block may be manufactured by combining honeycomb fired bodies 220, 230 and 240 each of which has a plurality of cells 221, 231 or 241 with a cell wall 223, 233 or 243 interposed therebetween, as shown in FIGS. 17 A to C.

Here, upon manufacturing the honeycomb block 15 shown in FIG. 2, four pieces of each of the honeycomb fired bodies 220 and 240, and eight pieces of the honeycomb fired bodies 230 are used.

In this case, the honeycomb structure may have cells each sealed at a predetermined end, like in the first to eighth embodiments of the present invention, or may have unsealed cells, like in the ninth and tenth embodiments of the present invention.

In the honeycomb structure according to the embodiments of the present invention described above, there is no description on supporting of a catalyst on the manufactured honeycomb structure. However, a catalyst may be supported on the honeycomb structure manufactured in the embodiments of the present invention.

As a method for supporting a catalyst on a honeycomb structure, for example, a method may be used in which an oxide film (oxide layer), made of alumina or the like having a high specific surface area, is formed on the surface of the honeycomb structure, and a catalyst containing a noble metal, an alkali metal, an alkali-earth metal, an oxide thereof or the like is applied to the surface of the oxide film.

Here, the catalyst may be supported not on a completed honeycomb structure, but on inorganic particles (ceramic powders) in the wet mixture.

By using such a method, a catalyst can be supported on the honeycomb structure. The honeycomb structure with a catalyst supported thereon and an exhaust-gas-purifying apparatus provided with the honeycomb structure make it possible to convert toxic components such as CO, HC and NOx contained in exhaust gases. Moreover, it is possible to lower the burning temperature of PM.

In the embodiments of the present invention, when a paste containing at least inorganic particles and an inorganic binder is used as the plug material paste, examples of the inorganic particles include carbides, nitrides and the like, more specifically, inorganic particles including silicon carbide, silicon nitride or boron nitride. Each of these may be used alone, or two or more kinds of these may be used in combination. Silicon carbide is preferably used among these inorganic particles due to its superior thermal conductivity.

Examples of the inorganic binder include silica sol, alumina sol and the like. Each of these may be used alone, or two or more kinds of these may be used in combination. Silica sol is preferably used among the inorganic binders.

In addition, the plug material paste may contain at least one of inorganic fibers and whiskers. Here, examples of the constituent materials of the inorganic fibers and the whiskers include silica-alumina, mullite, alumina, silica, and the like. Each of these may be used alone, or two or more kinds of these may be used in combination. Alumina is preferably used among the constituent materials of the inorganic fibers and the whiskers.

As described above, the plug material paste may have almost the same composition as that of the wet mixture used for manufacturing the honeycomb fired body by extrusion-molding.

Here, the former material (plug material paste containing at least inorganic particles and an inorganic binder) is preferably used as the plug material paste for forming the plug portions formed without carrying out the firing treatment thereon, and the latter material (wet mixture) is preferably used for forming the plug portions formed through the firing treatment.

However, the former plug material paste may be used as the material for the plug portions formed through the firing treatment, or the latter plug material paste may be used as the material for the plug portions formed without carrying out the firing treatment thereon.

The shape of the honeycomb structure manufactured in the embodiments of the present invention is not limited to the round pillar shape shown in FIG. 2, and the shape may be an optional pillar shape such as cylindroid pillar shape and polygonal pillar shape.

A porosity of the honeycomb fired body that forms the honeycomb structure manufactured in each of the first to eighth embodiments of the present invention is preferably at least about 35% and at most about 60%.

An average pore diameter of the honeycomb fired body is preferably at least about 5 µm and at most about 30 µm.

Here, the porosity and the average pore diameter can be measured by the conventionally known methods such as mercury porosimetry method, an Archimedes' method, and a measuring method using a scanning electron microscope (SEM).

A particle diameter of the ceramic powder in the wet mixture extrusion-molded in the method for manufacturing a honeycomb structure body of the first to eighth embodiments of the present invention is not particularly limited, and a ceramic powder which tends not to cause the case where a size of the honeycomb structure manufactured by the following firing treatment becomes smaller than that of a degreased honeycomb molded body is preferable.

For example, a ceramic powder containing 100 parts by weight of a powder having an average particle diameter of at least about 1.0 µm and at most about 50.0 µm and at least about 5 parts by weight and at most about 65 parts by weight of a powder having an average particle diameter of at least about 0.1 µm and at most about 1.0 µm is preferable.

In the methods for manufacturing a honeycomb structure according to the ninth and tenth embodiments, as the inorganic fibers contained in the wet mixture to be extrusion-molded, inorganic fibers having an aspect ratio of at least about 2 and at most about 1000 are desirably used. More desirably, inorganic fibers having an aspect ratio of at least about 5 and at most about 800, and further more desirably, inorganic fibers having an aspect ratio in the range of about 10 to about 500 are used.

Moreover, the honeycomb fired body that forms the honeycomb structure manufactured in each of the ninth and tenth embodiments of the present invention contains inorganic fibers and inorganic particles. Here, the content of the inorganic fibers is preferably at least about 3% by weight and at most about 70% by weight, more preferably in the range of about 3% by weight to about 50% by weight, further more preferably in the range of about 5% by weight to about 40% by weight, and still further more preferably in the range of about 8% by weight to about 30% by weight. However, the content of the inorganic particles is preferably at least about 30% by weight and at most about 97% by weight, more preferably in the range of about 30% by weight to about 90% by weight, further more preferably in the range of about 40% by weight to about 80% by weight, and still further more preferably in the range of about 50 to about 75% by weight.

An organic binder contained in the wet mixture to be extrusion-molded in the method for manufacturing a honeycomb structure of the embodiments of the present invention is not particularly limited, and examples thereof include methyl cellulose, carboxymethyl cellulose, hydroxyethyl cellulose, polyethylene glycol and the like.

A plasticizer contained in the wet mixture is not particularly limited, and examples thereof include glycerin, and the like.

A lubricant contained in the wet mixture is not particularly limited, and examples thereof include polyoxyalkylene-based compounds such as polyoxyethylene alkyl ether and polyoxypropylene alkyl ether, and the like.

The specific examples of the lubricant include polyoxyethylene monobutyl ether, polyoxypropylene monobutyl ether, and the like.

Here, depending on the case, a plasticizer and a lubricant may not be contained in the wet mixture.

Also, a dispersion medium may be used upon preparing the wet mixture, and examples thereof include water, an organic solvent such as benzene, alcohol such as methanol, and the like.

Moreover, a forming auxiliary may be added to the wet mixture.

The forming auxiliary is not particularly limited, and examples thereof include ethylene glycol, dextrin, fatty acids, fatty acid soap, polyalcohol, and the like.

Furthermore, a pore-forming agent such as balloons that are fine hollow spheres including oxide-based ceramics, spherical acrylic particles, and graphite may be added to the wet mixture as needed.

The balloons are not particularly limited, and examples thereof include alumina balloons, glass micro balloons, shirasu balloons, fly ash balloons (FA balloons), mullite balloons, and the like. Alumina balloons are preferable among these.

Moreover, in the first to tenth embodiments of the present invention, upon combining the plurality of honeycomb fired bodies with one another, the method is used in which the adhesive paste is applied to the side faces of the respective honeycomb fired bodies, and the honeycomb fired bodies are successively laminated. However, the plurality of honeycomb fired bodies may be combined with one another as follows. A spacer is attached to the surface of each honeycomb fired body so as to ensure a space between the honeycomb fired bodies. The honeycomb fired bodies are arranged with the spacer interposed therebetween, and then an adhesive paste is injected into the space between the honeycomb fired bodies to combine the honeycomb fired bodies with one another.

In the first to tenth embodiments of the present invention, the honeycomb block is manufactured by combining the plurality of honeycomb fired bodies with one another. However, in the embodiments of the present invention, the honeycomb block does not necessarily need to be formed by the plurality of honeycomb fired bodies combined with one another, but the honeycomb block may be formed by a single honeycomb fired body.

Here, when a honeycomb block is manufactured by using a single honeycomb fired body, upon extrusion-molding a wet mixture, a honeycomb molded body which has almost the same cross-sectional shape perpendicular to the longitudinal direction thereof as the cross-sectional shape of a honeycomb block perpendicular to the longitudinal direction thereof, may be manufactured.

What is claimed as new and desired to be secured by Letters Patent of the United States is:

1. A method for manufacturing a honeycomb structure, comprising:
    molding a ceramic raw material to manufacture a plurality of honeycomb molded bodies each having a plurality of cell walls extending along a longitudinal direction thereof to define cells;
    firing said plurality of honeycomb molded bodies to manufacture a plurality of honeycomb fired bodies;
    connecting said plurality of honeycomb fired bodies to each other with an adhesive paste provided between the plurality of honeycomb fired bodies to manufacture a honeycomb block;
    cutting the honeycomb block after manufacturing the honeycomb block into two pieces having a substantially equal longitudinal length; and
    providing a plug material paste in the cells at either one end of each of the cells after cutting.

2. The method for manufacturing a honeycomb structure according to claim 1, further comprising:
    solidifying or firing the plug material paste provided in the cells.

3. The method for manufacturing a honeycomb structure according to claim 1, wherein the plug material paste comprises at least inorganic particles and an inorganic binder.

4. The method for manufacturing a honeycomb structure according to claim 3, wherein said plug material paste further comprises at least one of inorganic fibers and whiskers.

5. The method for manufacturing a honeycomb structure according to claim 1, wherein composition of said plug material paste is substantially same as composition of said ceramic raw material.

6. The method for manufacturing a honeycomb structure according to claim 1, wherein composition of said plug material paste is substantially same as composition of said adhesive paste.

7. The method for manufacturing a honeycomb structure according to claim 1, further comprising:
    applying a coating material paste to a periphery of said honeycomb block to provide a coat layer after manufacturing said honeycomb block.

8. The method for manufacturing a honeycomb structure according to claim 7, wherein said coat layer is provided by heating and thereby solidifying said coating material paste.

9. The method for manufacturing a honeycomb structure according to claim 7, wherein composition of said plug material paste is substantially same as composition of said coating material paste.

10. The method for manufacturing a honeycomb structure according to claim 1, further comprising:
    applying a coating material paste to a periphery of said honeycomb block to provide a coat layer after manufacturing said honeycomb block.

11. The method for manufacturing a honeycomb structure according to claim 10, wherein said coat layer is provided by heating and thereby solidifying said coating material paste.

12. The method for manufacturing a honeycomb structure according to claim 1, wherein the plurality of honeycomb fired bodies or the honeycomb block is cut by using at least one of a diamond cutter, an OD diamond blade, an ID diamond blade, a multi-wire, and a multi-blade.

13. The method for manufacturing a honeycomb structure according to claim 1, wherein a plug material paste is not injected in such a manner that each of the cells is sealed at either one end thereof.

14. The method for manufacturing a honeycomb structure according to claim 1, wherein the honeycomb fired bodies comprise at least one of
    at least one of nitride ceramics, carbide ceramics, and oxide ceramics,
    silicon-containing ceramics which comprises at least one of nitride ceramics, carbide ceramics, and oxide ceramics which include metallic silicon, and
    a ceramic material in which said at least one of nitride ceramics, carbide ceramics, and oxide ceramics are bound by at least one of silicon or silicate compounds.

15. The method for manufacturing a honeycomb structure according to claim 1, wherein the honeycomb fired bodies comprise at least one of silicon carbide and silicon-containing silicon carbide.

16. The method for manufacturing a honeycomb structure according to claim 1, wherein said ceramic raw material comprises a raw material to manufacture a fired body comprising one of cordierite and aluminum titanate.

17. The method for manufacturing a honeycomb structure according to claim 1, wherein said ceramic raw material comprises a wet mixture containing inorganic fibers, inorganic particles, and an inorganic binder.

18. The method for manufacturing a honeycomb structure according to claim 17,
    wherein said inorganic fibers comprise silica-alumina fibers, and
    wherein said inorganic particles comprise alumina particles.

19. The method for manufacturing a honeycomb structure according to claim 17, wherein said inorganic fibers comprise at least one of silica-alumina fibers, alumina fibers, silica fibers, silicon carbide fibers, glass fibers, and potassium titanate fibers.

20. The method for manufacturing a honeycomb structure according to claim 17, wherein said inorganic particles comprise at least one of alumina particles, silicon carbide particles, silicon nitride particles, silica particles, zirconia particles, titania particles, ceria particles, and mullite particles.

21. The method for manufacturing a honeycomb structure according to claim 17, wherein said inorganic binder comprises at least one of alumina sol, silica sol, titania sol, water glass, white clay, kaolin, montmorillonite, sepiolite, and attapulgite.

22. The method for manufacturing a honeycomb structure according to claim 1, wherein the plurality of honeycomb molded bodies are fired at from about 600° C. to about 1200° C.

23. The method for manufacturing a honeycomb structure according to claim 1,
wherein the plurality of honeycomb fired bodies are connected to each other with an adhesive paste provided between the plurality of honeycomb fired bodies to manufacture connected honeycomb fired bodies, and
wherein the connected honeycomb fired bodies are cut to manufacture the honeycomb block.

24. The method for manufacturing a honeycomb structure according to claim 1,
wherein the plurality of honeycomb fired bodies each have a predetermined shape, and
wherein the plurality of honeycomb fired bodies are connected to one another to manufacture the honeycomb block.

25. A method for manufacturing a honeycomb structure, comprising:
molding a ceramic raw material to manufacture at least one honeycomb molded body having a plurality of cell walls extending along a longitudinal direction of the at least one honeycomb molded body to define cells;
providing a first plug material paste in the cells at either one end of each of the cells to seal cells;
firing said at least one honeycomb molded body with the plug material paste to manufacture at least one honeycomb fired body;
manufacturing a honeycomb block by using said at least one honeycomb fired body;
cutting each of the at least one honeycomb fired body into cut honeycomb fired bodies having cut end so that a longitudinal length of the cut honeycomb fired body is shorter than a longitudinal length of the honeycomb fired body before the cutting;
providing a second plug material paste in the cells at the cut end to seal the respective cells at either one end in the longitudinal direction; and
firing said second plug material paste.

26. The method for manufacturing a honeycomb structure according to claim 25, wherein, after firing said second plug material paste, the cut honeycomb fired bodies are connected to each other with an adhesive paste provided between the cut honeycomb fired bodies to manufacture the honeycomb block.

27. The method for manufacturing a honeycomb structure according to claim 26, further comprising:
applying a coating material paste to a periphery of said honeycomb block to form a coat layer after said honeycomb block is manufactured.

28. The method for manufacturing a honeycomb structure according to claim 27, wherein said coating material paste is heated to be solidified.

29. The method for manufacturing a honeycomb structure according to claim 27, wherein composition of the first plug material paste and the second plug material paste are substantially same as composition of said coating material paste.

30. The method for manufacturing a honeycomb structure according to claim 27, wherein composition of said adhesive paste is substantially same as composition of said coating material paste.

31. The method for manufacturing a honeycomb structure according to claim 25, further comprising:
applying a coating material paste to a periphery of said honeycomb block to form a coat layer after said honeycomb block is manufactured.

32. The method for manufacturing a honeycomb structure according to claim 25, wherein composition of the first plug material paste and the second plug material paste are substantially same as composition of said ceramic raw material.

33. The method for manufacturing a honeycomb structure according to claim 25, wherein said honeycomb fired body is cut by using at least one of a diamond cutter, an OD diamond blade, an ID diamond blade, a multi-wire, and a multi-blade.

34. The method for manufacturing a honeycomb structure according to claim 25, wherein a plug material paste is not injected in such a manner that each of the cells is sealed at either one end thereof.

35. The method for manufacturing a honeycomb structure according to claim 25, wherein the honeycomb fired body comprises at least one of
at least one of nitride ceramics, carbide ceramics, and oxide ceramics,
silicon-containing ceramics which comprises at least one of nitride ceramics, carbide ceramics, and oxide ceramics which include metallic silicon, and
a ceramic material in which said at least one of nitride ceramics, carbide ceramics, and oxide ceramics are bound by at least one of silicon or silicate compounds.

36. The method for manufacturing a honeycomb structure according to claim 25, wherein the honeycomb fired body comprises at least one of silicon carbide and silicon-containing silicon carbide.

37. The method for manufacturing a honeycomb structure according to claim 25, wherein said ceramic raw material comprises a raw material to manufacture a fired body comprising one of cordierite and aluminum titanate.

38. The method for manufacturing a honeycomb structure according to claim 25, wherein said ceramic raw material comprises a wet mixture containing inorganic fibers, inorganic particles, and an inorganic binder.

39. The method for manufacturing a honeycomb structure according to claim 38,
wherein said inorganic fibers comprise silica-alumina fibers, and
wherein said inorganic particles comprise alumina particles.

40. The method for manufacturing a honeycomb structure according to claim 38, wherein said inorganic fibers comprise at least one of silica-alumina fibers, alumina fibers, silica fibers, silicon carbide fibers, glass fibers, and potassium titanate fibers.

41. The method for manufacturing a honeycomb structure according to claim 38, wherein said inorganic particles comprise at least one of alumina particles, silicon carbide particles, silicon nitride particles, silica particles, zirconia particles, titania particles, ceria particles, and mullite particles.

42. The method for manufacturing a honeycomb structure according to claim 38, wherein said inorganic binder comprises at least one of alumina sol, silica sol, titania sol, water glass, white clay, kaolin, montmorillonite, sepiolite, and attapulgite.

43. The method for manufacturing a honeycomb structure according to claim 25, wherein the at least one honeycomb molded body is fired at from about 600° C. to about 1200° C.

44. The method for manufacturing a honeycomb structure according to claim 25,
- wherein the at least one honeycomb fired body comprises a plurality of honeycomb fired bodies,
- wherein the plurality of honeycomb fired bodies are connected to each other with an adhesive paste provided between the plurality of honeycomb fired bodies to manufacture connected honeycomb fired bodies, and
- wherein the connected honeycomb fired bodies are cut to manufacture the honeycomb block.

45. The method for manufacturing a honeycomb structure according to claim 25,
- wherein the at least one honeycomb fired body comprises a plurality of honeycomb fired bodies each having a predetermined shape, and
- wherein the plurality of honeycomb fired bodies are connected to one another to manufacture the honeycomb block.

46. The method for manufacturing a honeycomb structure according to claim 25, wherein said honeycomb block is manufactured by using said one honeycomb fired body.

* * * * *